(12) United States Patent  (10) Patent No.: US 6,507,358 B1
Mori et al.  (45) Date of Patent: Jan. 14, 2003

(54) MULTI-LENS IMAGE PICKUP APPARATUS

(75) Inventors: Katsuhiko Mori, Kawasaki (JP); Katsumi Iijima, Hachioji (JP); Kotaro Yano, Yokohama (JP); Sunao Kurahashi, Kawasaki (JP); Takeo Sakimura, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/087,506

(22) Filed: May 29, 1998

(30) Foreign Application Priority Data

Jun. 2, 1997 (JP) ............................................. 9-157315

(51) Int. Cl.⁷ ................................................. H04K 7/18
(52) U.S. Cl. .............................. 348/42; 348/43; 348/46; 348/47
(58) Field of Search .......................... 348/36–39, 42–59

(56) References Cited

U.S. PATENT DOCUMENTS

| | | | |
|---|---|---|---|
| 5,523,886 A | * 6/1996 | Johnson-Williams et al. | 348/51 |
| 5,546,120 A | * 8/1996 | Miller et al. | 348/59 |
| 5,627,582 A | * 5/1997 | Muramoto et al. | 348/43 |
| 5,699,108 A | * 12/1997 | Katayama et al. | 348/333.02 |
| 5,937,212 A | * 8/1999 | Kurahashi et al. | 348/38 |
| 5,963,247 A | * 10/1999 | Banitt | 348/42 |
| 5,973,726 A | * 10/1999 | Iijima et al. | 348/38 |
| 6,112,033 A | * 8/2000 | Yano et al. | 348/36 |

FOREIGN PATENT DOCUMENTS

| | | | |
|---|---|---|---|
| JP | 62-21396 | 1/1987 | H04N/13/02 |
| JP | 5-107663 | 4/1993 | G03B/35/24 |
| JP | 6-141237 | 5/1994 | H04N/5/265 |
| JP | 6-217184 | 8/1994 | H04N/5/232 |
| JP | 7-234459 | 9/1995 | G03B/35/00 |
| JP | 8-206455 | 8/1996 | B01D/53/86 |
| JP | 8-304670 | 11/1996 | G02B/6/42 |

* cited by examiner

*Primary Examiner*—Andy Rao
(74) *Attorney, Agent, or Firm*—Fitzpatrick, Cella, Harper & Scinto

(57) ABSTRACT

There is disclosed a multi-lens image pickup apparatus provided with plural image pickup systems and an image display means and adapted to synthesize the plural images picked up respectively with the plural image pickup systems, into one, to store the synthesized image in image memory means and to display the stored image on the image display means. The camera further comprises horizontal compression means for comprising the plural picked-up images in the horizontal directions, selection means for compressing the plural images in the vertical direction by selecting the input of the plural image signals and outputting thus selected image signal to the image display means, and memory control means for storing the compressed plural images in said image memory means in such a manner that the plural images compressed in the horizontal and vertical directions are displayed in an arranged manner.

18 Claims, 21 Drawing Sheets

320
41
PANORAMA IMAGE
240

640
42
LEFT IMAGE
480

640
43
RIGHT IMAGE
480

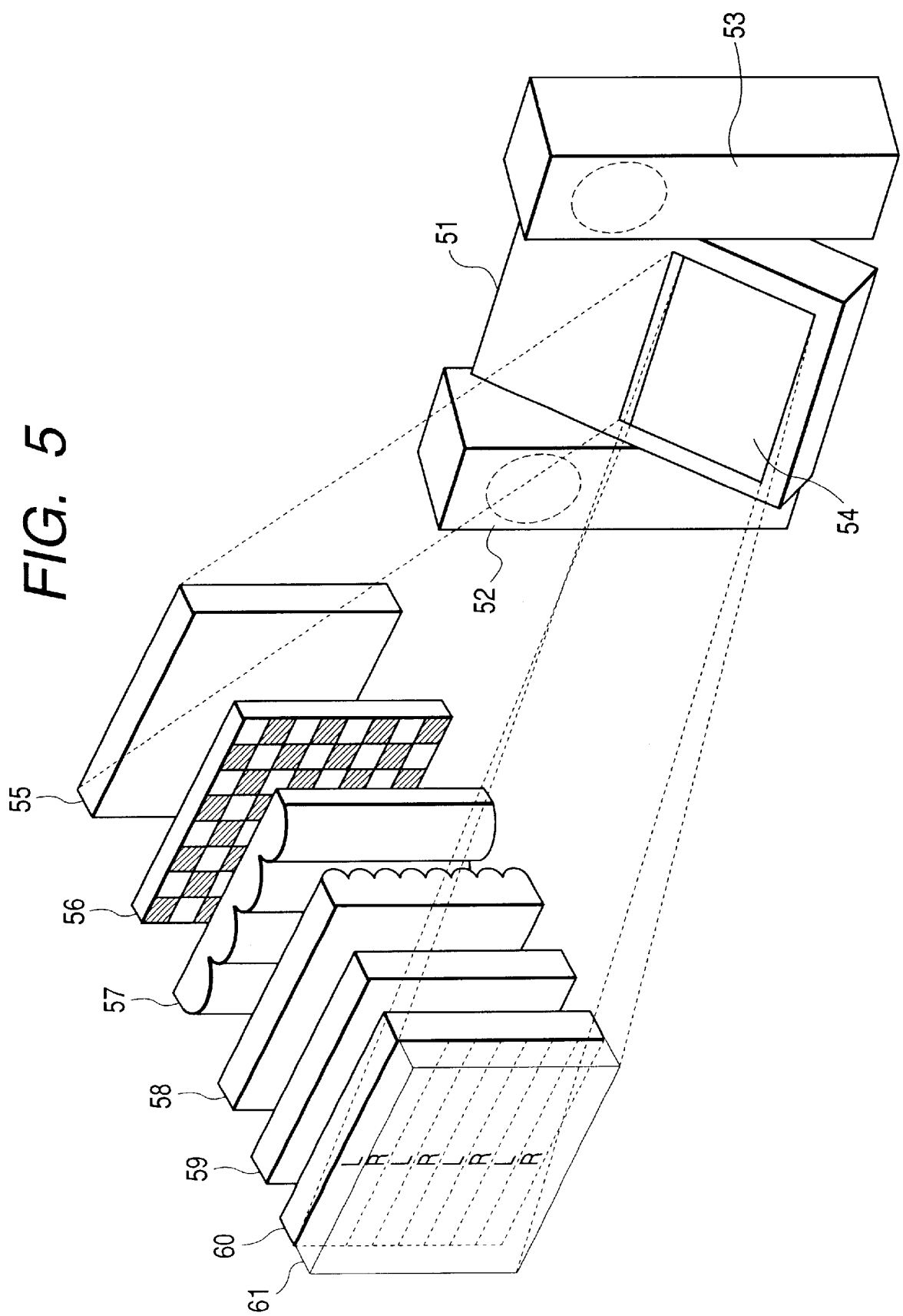

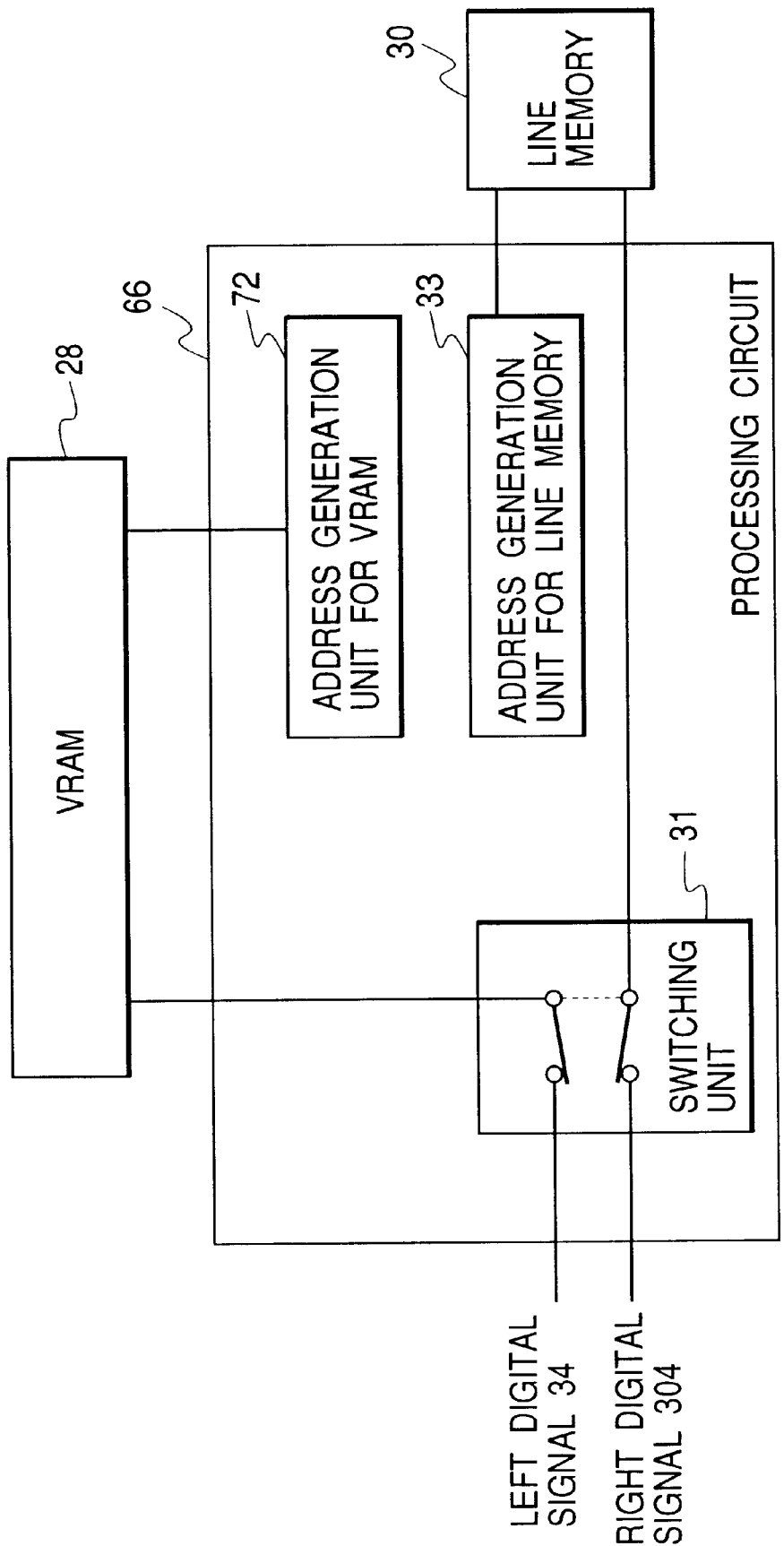

81 STEREOSCOPIC IMAGE

82 LEFT IMAGE

83 RIGHT IMAGE

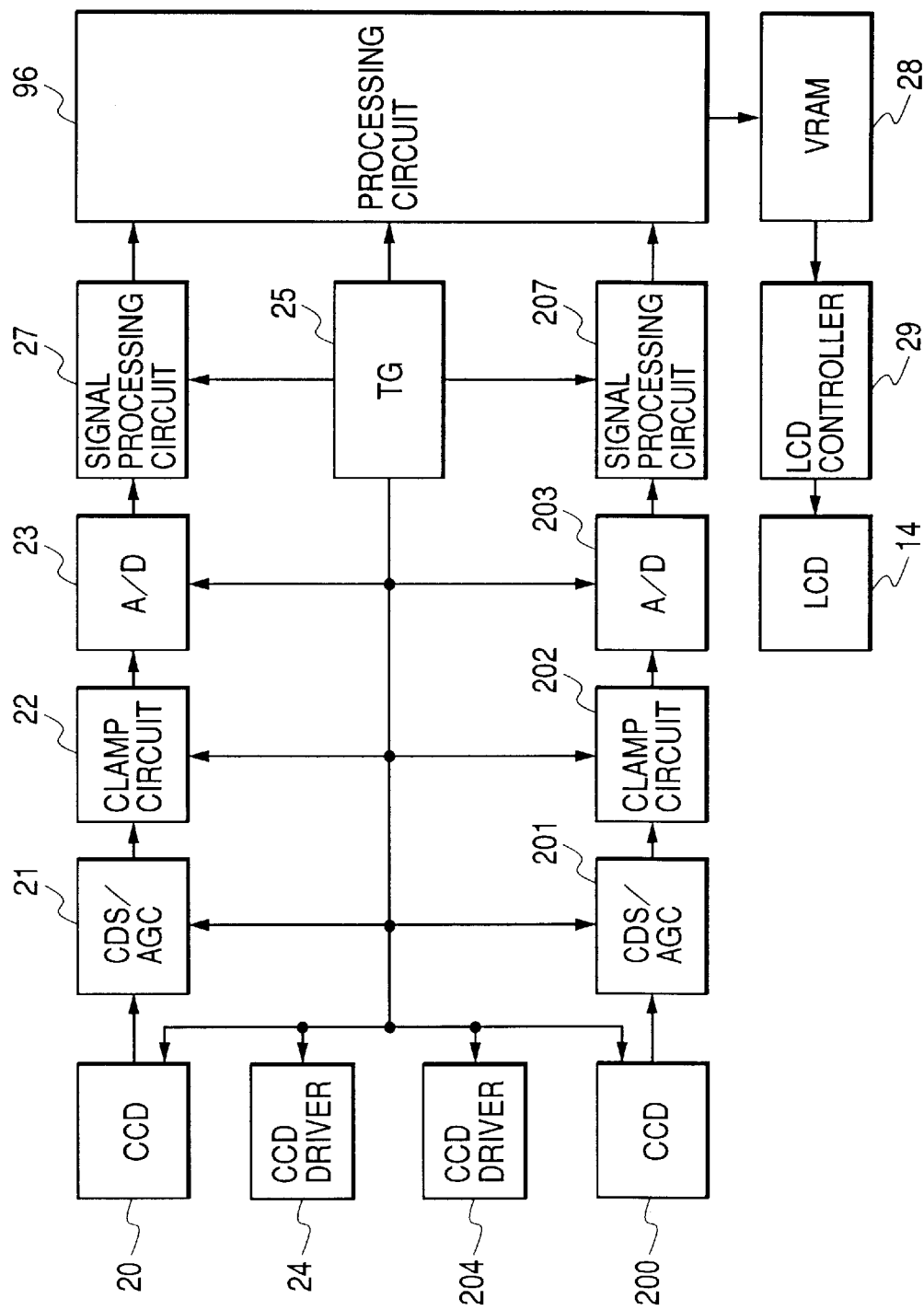

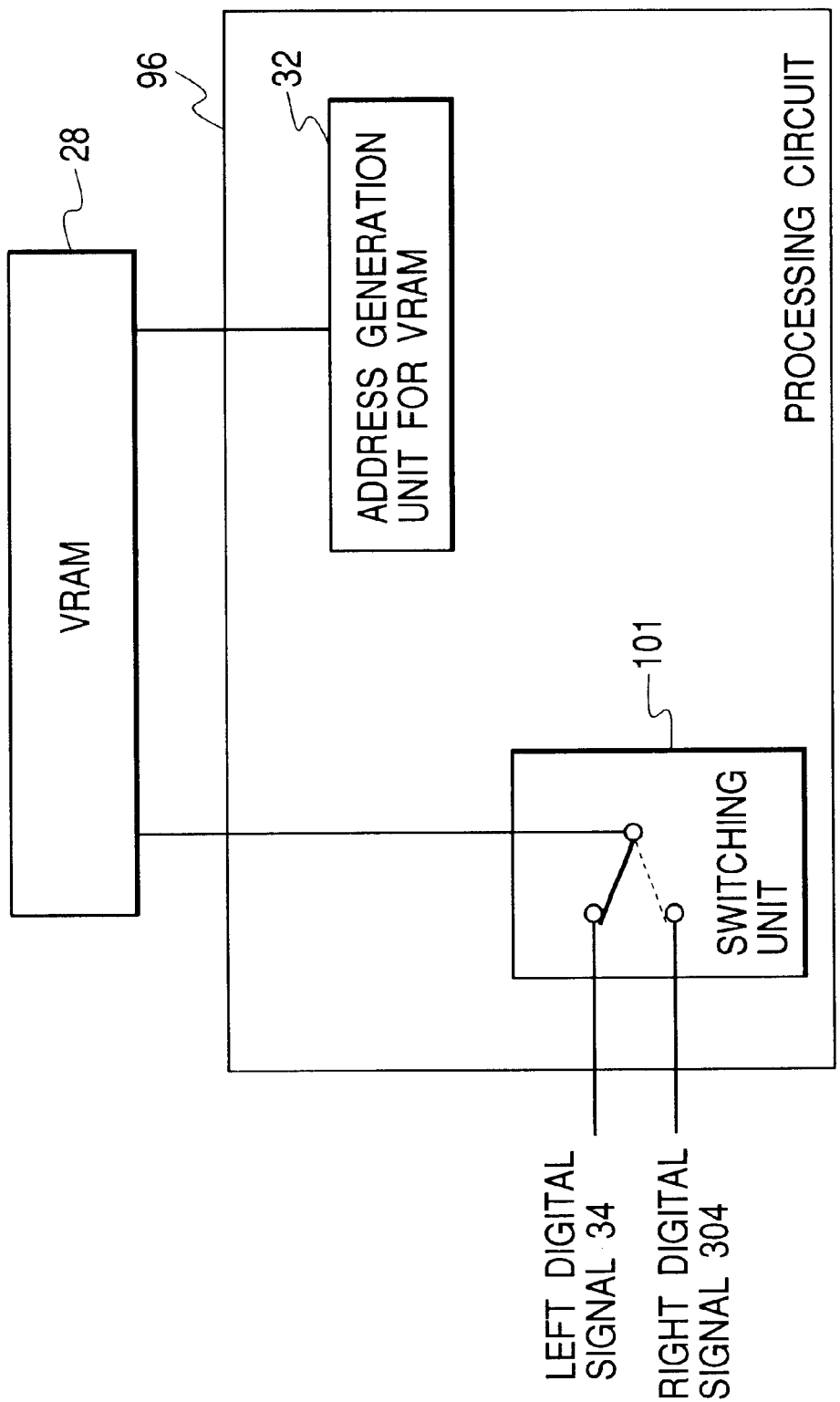

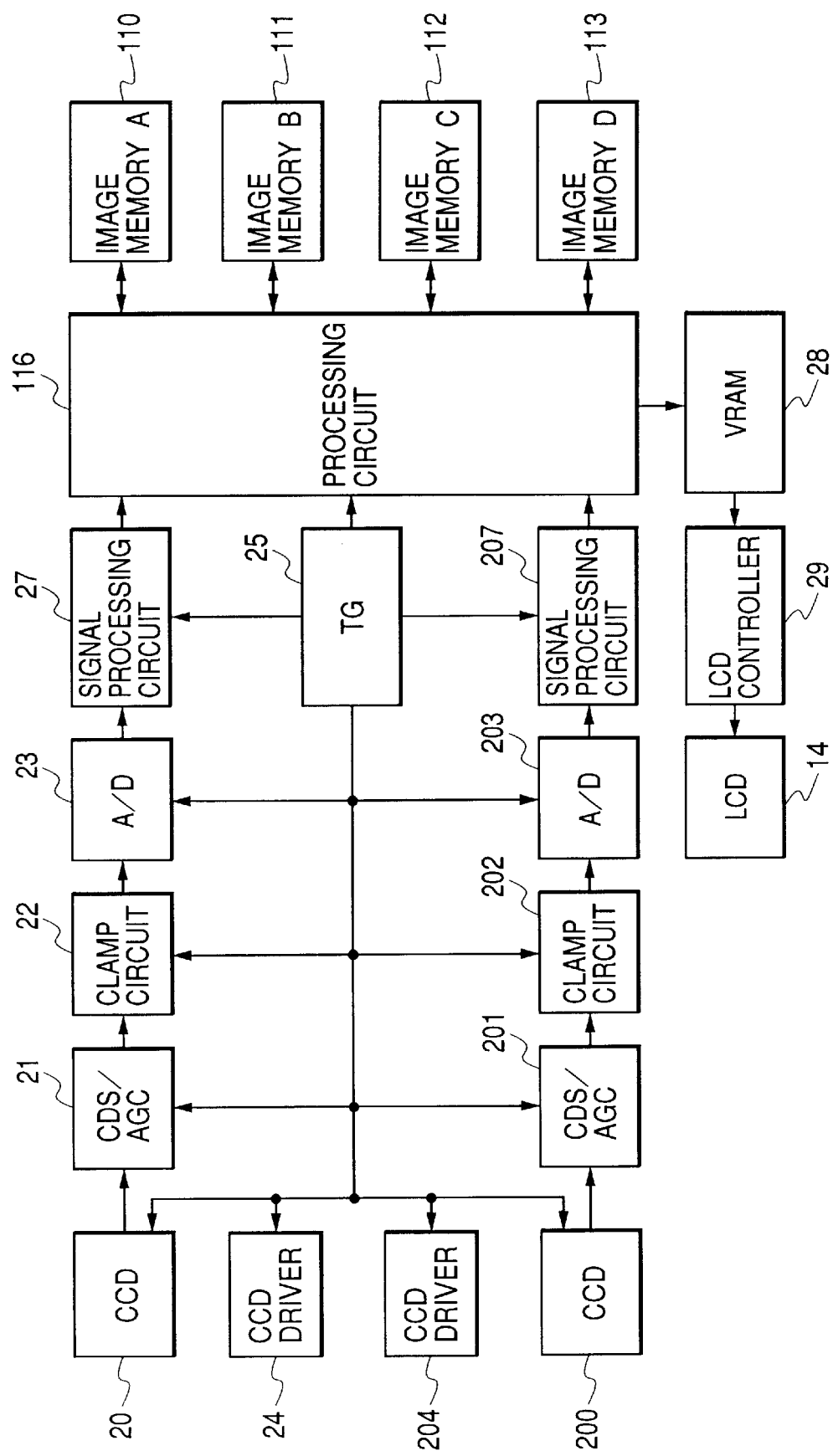

EVEN FRAME          ODD FRAME

MULTI-LENS IMAGE PICKUP APPARATUS

BACKGROUND OF THE INVENTION

1. Field of the Invention

The present invention relates to a multi-lens image pickup apparatus having plural image pickup systems.

2. Related Background Art

In a camera having a single image pickup system and single image display means, the image picked up by the image pickup system is conventionally stored in a video memory (VRAM) provided in the camera. Thereafter the controller of the image display means reads, from the VRAM, the pixel values of the points constituting the image and display the image on the image display means. In such single-eyed camera system, the image picked up by the image pickup system can be simply entered in the VRAM, so that a moving image can also be displayed on the image display means with an image pickup rate same as that for the still image.

On the other hand, as a system for picking up and displaying a stereoscopic image, there is conventionally known, for example, a stereoscopic television apparatus disclosed in the Japanese Patent Laid-open Application No. 62-21396. In such stereoscopic image pickup and displaying system, a set of images having a parallax are basically picked up with plural cameras and are displayed on an exclusive stereoscopic image display device to provide a stereoscopic image to the photographer.

In such stereoscopic image pickup/displaying system, as the cameras for image pickup are separated from the stereoscopic display device for stereoscopic image display, the photographer is unable to constantly observe the stereoscopic image, so that it is difficult to adjust the cameras under the observation of the image.

Also in case of image pickup while the cameras are moved, there are required operations of, at first, picking up the image while the display is detached and then editing the image while the image is displayed, so that the stereoscopic image cannot be picked up in a simple manner.

Also for displaying a stereoscopic image, there is known a method of forming a right-eye image and a left-eye image of different polarized states and separating the left and right images with polarizing spectacles, and, for forming such different polarized state, the display device is provided with a liquid crystal shutter for switching the polarized state in synchronization with the field signal of the displayed image, whereby the observer wearing the polarizing spectacles observes the left and right images with respective eyes, one at a time on time-shared basis, the stereoscopic observation is enabled. This method, however, is associated with a drawback that the observer has to always wear the polarizing spectacles.

On the other hand, for stereoscopic image display without such polarizing spectacles, there is known a method of providing a lenticular lens in front of the display, thereby spatially separating the image entering the left and right eyes. FIGS. 21A and 21B show a conventional stereoscopic image display method employing the lenticular lens. Referring to FIG. 21A showing a view seen from the top of the observer, there is shown a display pixel unit 60 of a liquid crystal display, of which the glass substrates, color filters, electrodes, polarizing plates, rear light source etc. are omitted. The display pixel unit 60 is composed of apertures 61 constituting pixels and provided with color filters, and a black matrix 62 separating the pixels. The apertures 61 are arranged as shown in FIG. 21B.

On the surface of the liquid crystal display, there is provided a lenticular lens 63 consisting of cylindrical lenses each having a semicircular cross section and extending in a direction perpendicular to the plane of the drawing, and the display pixel unit 60 of the liquid crystal display is positioned at the focal plane of such lenticular lens. On the display pixel unit 60, right-eye images (R) and left-eye images (L) of stripe shape are alternately arranged in such a manner that a pair of such images corresponds to a pitch of the lenticular lens 63, and are optically separated by the lenticular lens 63 to the right eye Er and the left eye El of the observer whereby the stereoscopic observation is rendered possible.

In FIG. 21A there are illustrated spatial areas where the right-eye image and the left-eye image can be respectively observed by the cylindrical lens at the central part of the display. For each of other cylindrical lenses, the spatial areas are similarly separated at the left and at the right for the respective eyes of the observer, whereby the left and right images are uniformly separated and observed over the entire image area.

In this method, the horizontal resolving power of the image display device is reduced to 1/2 since the stripe images, synthesized from the two parallax images, have to be displayed.

On the other hand, the Japanese Patent Laid-open Application Nos. 5-107663 and 7-234459 disclose stereoscopic image display devices without loss of the resolving power. FIGS. 22A to 22C illustrate the configuration and the display method of the stereoscopic image display device disclosed in the Japanese Patent Laid-open Application No. 5-107663. This device is composed of a light directionality switching device 72 consisting of a matrix planar light source 70 and a lenticular lens sheet 71, and a transmissive display device 73 (FIG. 22A). When stripe-shaped light sources 70R for the right eye (cf. FIG. 22B) are turned on, an image 73R for the right eye is displayed in synchronization in an odd frame (or field) (cf. FIG. 22C), and, when stripe-shaped light sources 70L for the left eye are turned on, an image 73L for the left eye is displayed in synchronization in an even frame (or field). Since all the pixels are used in each of the even and odd frames (or fields), the pixels need not be split and the horizontal resolving power is not deteriorated.

In the aforementioned conventional example, however, in case of displaying paired images picked up with a multi-lens image pickup apparatus, such paired images cannot be simultaneously written into the VRAM.

In order to overcome such drawback, there is known a method of writing an image into a half area of the VRAM while temporarily retaining the other image in another memory, and, after such image writing into the VRAM, transferring the other image from such memory to the VRAM, thereby displaying the image pair on single image display means. In such method, however, since the image displayed on the image display means is switched, there results a drawback that the display rate becomes slower in comparison with the image pickup rate.

On the other hand, the conventional configuration employing the lenticular lens on the surface of the liquid crystal display is associated with drawbacks that the image quality is deteriorated by the surface reflection from the lenticular lens surface and that the black matrix of the liquid crystal display is observed as moire fringes.

Also in the stereoscopic displaying method by displaying the right-eye image and the left-eye image on time-shared basis, the switching of the images has to be conducted at a high speed in order to prevent the flickering phenomenon.

Isono et al. reported, in 'Conditions for stereoscopic observation', Journal of Television Association, Vol. 41, No. 6 (1987), pp549–555, that stereoscopic observation could not be obtained with the time-shared method of a field (frame) frequency of 30 Hz.

Also the limit frequency at which the flickering is not sensed when both eyes are alternately opened and closed (called critical fusion frequency or CFF) is about 55 Hz, indicating that the field (frame) frequency has to be at least 110 Hz in terms of the flickering. Consequently there is required a transmissive display device capable of high-speed display.

Also in such stereoscopic image systems, there has not been considered the compatibility with the two-dimensional image which is dominant in the current image pickup systems. Stated differently, the stereoscopic image system and the two-dimensional image system have been constructed as separate independent systems. Consequently, the individual user wishing to pick up a stereoscopic image has to construct the system anew, involving cumbersome operations.

SUMMARY OF THE INVENTION

A first object of the present invention is to provide a multi-lens image pickup apparatus capable of picking up not only a panoramic or stereo image but also an ordinary image and enabling display of ordinary, panoramic and stereo images.

A second object of the present invention is to provide a multi-lens image pickup apparatus capable, in displaying paired images picked up with the multi-lens image pickup apparatus simultaneously on an image display unit, of displaying a moving image with a display rate equal to the image pickup rate.

A third object of the present invention is to provide a multi-lens image pickup apparatus capable, in reproducing the picked-up image, of improving the resolution of the stereoscopic image without increasing the display rate (frame rate) required for the image display unit, by displaying a thumbnail image thereon.

The above-mentioned objects can be attained, according to a preferred embodiment of the present invention, by a multi-lens image pickup apparatus provided with plural image pickup systems and an image display means adapted to store plural images respectively picked up with the plural image pickup systems in image memory means after synthesis into an image and to display the stored image on the image display means, the camera comprising horizontal compression means for compressing the plural picked-up images in the horizontal direction, selection means for selecting the input of the plural image signals and outputting thus selected image signal to the image display means thereby compressing the plural images in the vertical direction, and memory control means for storing the compressed plural images in the image memory means in such a manner that the plural images compressed in the horizontal and vertical directions are displayed in arranged manner.

Also the above-mentioned objects can be attained, according to a preferred embodiment of the present invention, by a multi-lens image pickup apparatus provided with plural image pickup systems and an image display means capable of displaying a stereoscopic image, and capable of synthesizing plural images respectively picked up with the plural image pickup systems thereby displaying a stereoscopic image or a panoramic image on the image display means, the camera comprising display control means for displaying, on the image display means, a thumbnail image corresponding to the stereoscopic or panoramic image.

Still other objects of the present invention, and the features thereof, will become fully apparent from the following description which is to be picked up in conjunction with the attached drawings.

BRIEF DESCRIPTION OF THE DRAWINGS

FIG. 5 is a view showing the external view of a multi-lens image pickup apparatus constituting a second embodiment and the structure of a display device therein;

FIG. 7 is a block diagram showing the configuration of a process circuit 66;

FIG. 9 is a block diagram showing the configuration of a multi-lens image pickup apparatus of a third embodiment;

FIG. 10 is a block diagram showing the configuration of a process circuit 96;

FIG. 11 is a block diagram showing the configuration of a multi-lens image pickup apparatus of a fourth embodiment;

DETAILED DESCRIPTION OF THE PREFERRED EMBODIMENTS

In the following the multi-lens image pickup apparatus of the present invention will be clarified in detail by embodiments thereof, with reference to the attached drawings.

Figure 1:
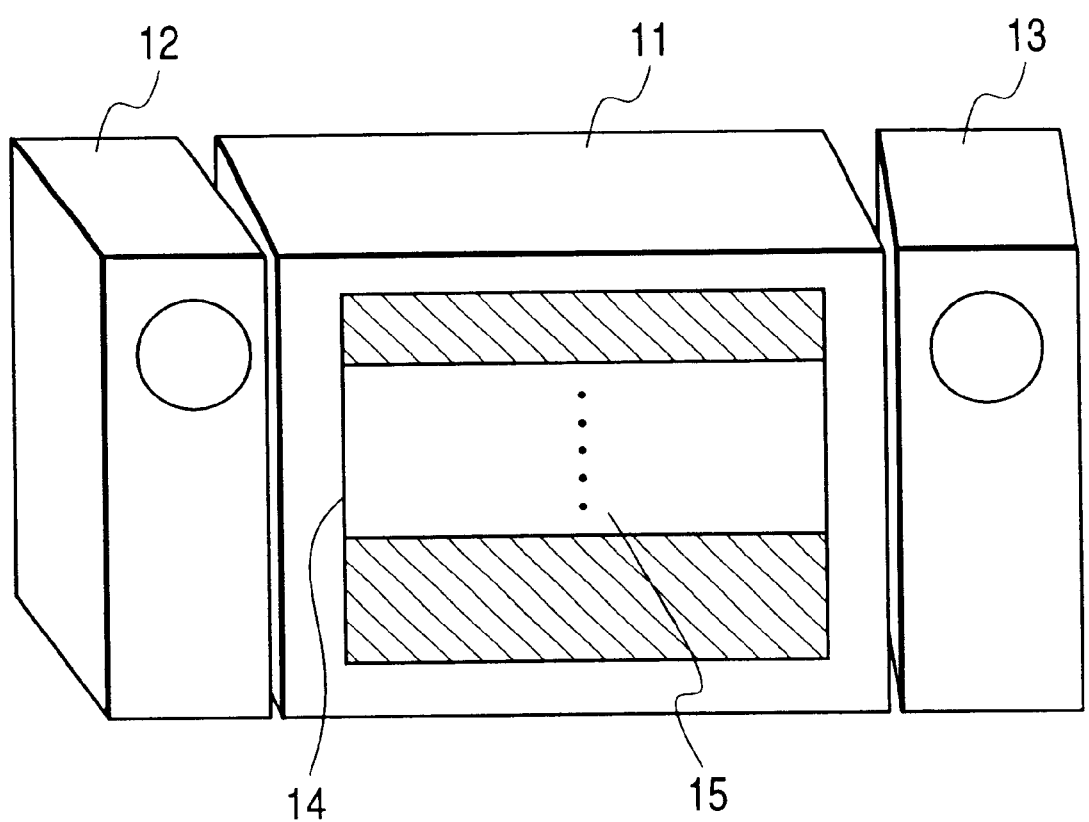
FIG. 1 is an external view of a multi-lens image pickup apparatus constituting a first embodiment.

FIG. 1 is an external view of a multi-lens image pickup apparatus constituting a first embodiment, wherein shown are a main body 11 of the multi-lens image pickup apparatus, a left image pickup system 12, a right image pickup system 13, a liquid crystal display 14, and a panoramic image 15 displayed on the liquid crystal display 14.

The multi-lens image pickup apparatus is provided with two image pickup systems 12, 13 for the left and right images and a liquid crystal display 14, wherein the optical axes of the left and right image pickup systems are positioned in outward diverging positions in such a manner that the image pickup ranges thereof mutually overlap slightly. The paired images picked up with such image pickup systems 12, 13 are displayed as a panoramic image 15 on the liquid crystal display 14.

Figure 2:
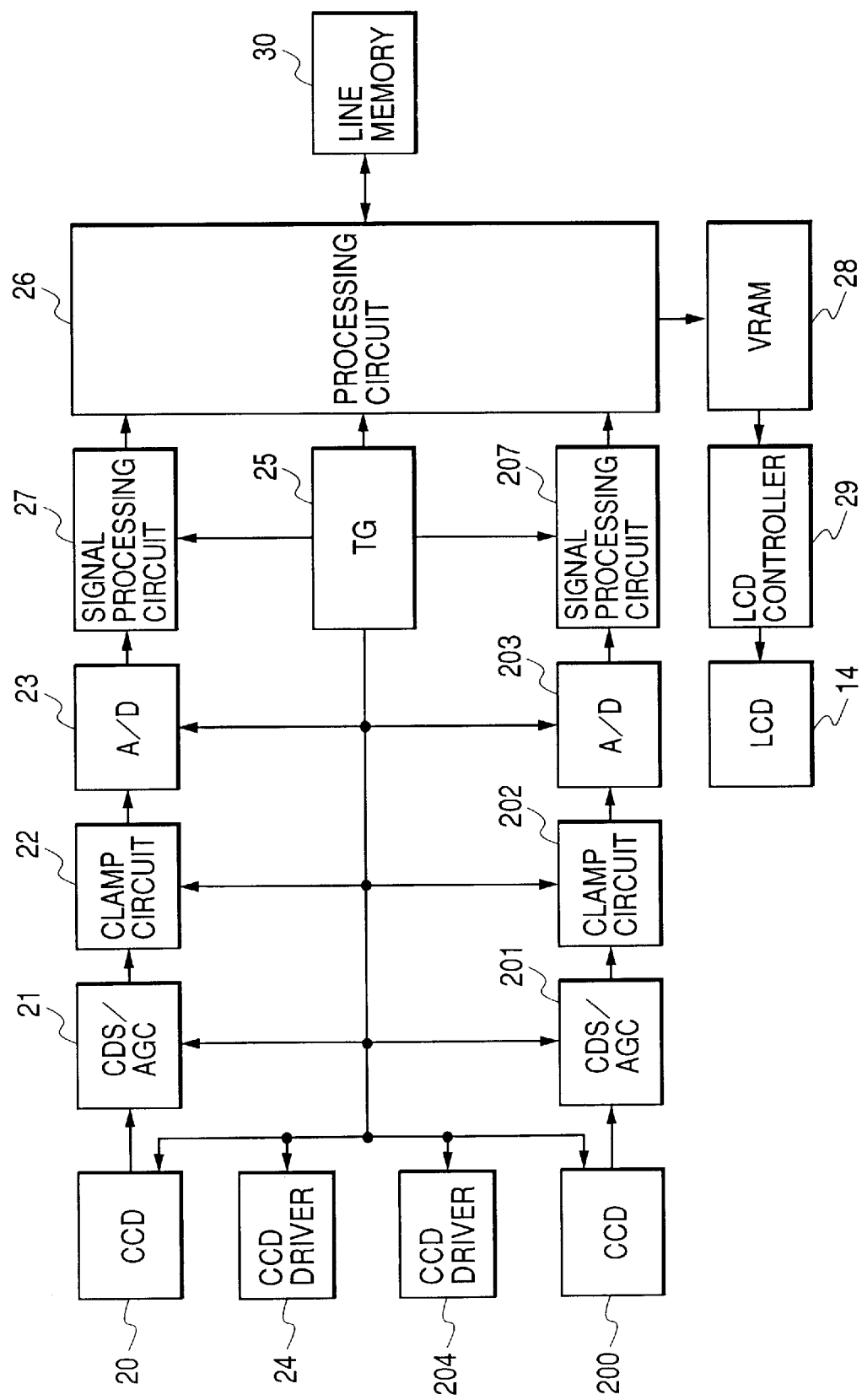
FIG. 2 is a block diagram showing the configuration of a multi-lens image pickup apparatus.

FIG. 2 is a block diagram showing the configuration of the multi-lens image pickup apparatus, wherein shown are CCD's 20, 200; CCD drivers 24, 204; CDS/AGC circuits 21, 201; and clamp circuit 22, 202.

There are also shown A/D converters 23, 203; a timing generator (TG) 25; a process circuit 26; signal processing circuits 27, 207; a VRAM 28; a liquid crystal display controller 29; and a line memory 30.

The images formed by the left and right image pickup systems are focused on the CCD's 20, 200 constituting the image pickup elements. The images subjected to photoelectric conversion therein are supplied through the CDS/AGC circuits 21, 201 and the clamp circuit 22, 202, and are converted into digital signals by the A/D converters 23, 203. In this operation, the left and right signals are processed in synchronization with a control signal from the timing generator 25, so that the left and right images picked up at a same time are simultaneously processed.

The digital signals obtained in the A/D converters 23, 203 are supplied to the signal processing circuits 27, 207 for a color conversion process etc. therein and are transferred through the process circuit 26 to the VRAM 28.

Figure 3:
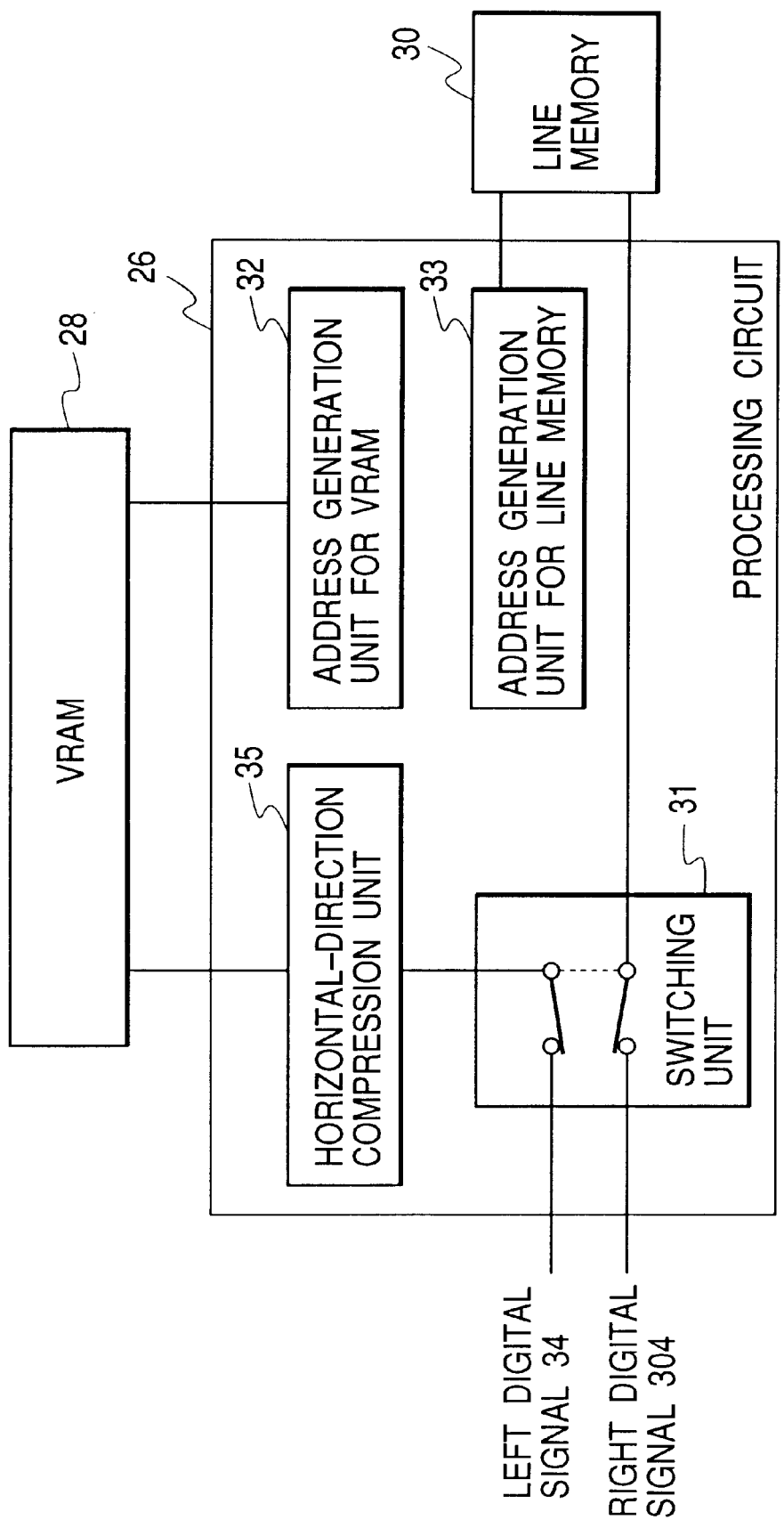
FIG. 3 is a block diagram showing the configuration of a process circuit 26.

FIG. 3 is a block diagram showing the configuration of the process circuit 26, wherein provided are a switching unit 31, a VRAM address generating unit 32, a line memory address generating unit 33, a left digital signal 34 from the signal processing circuit 27, a right digital signal 304 from the signal processing circuit 207, and a horizontal compression unit 35.

Figure 4A:
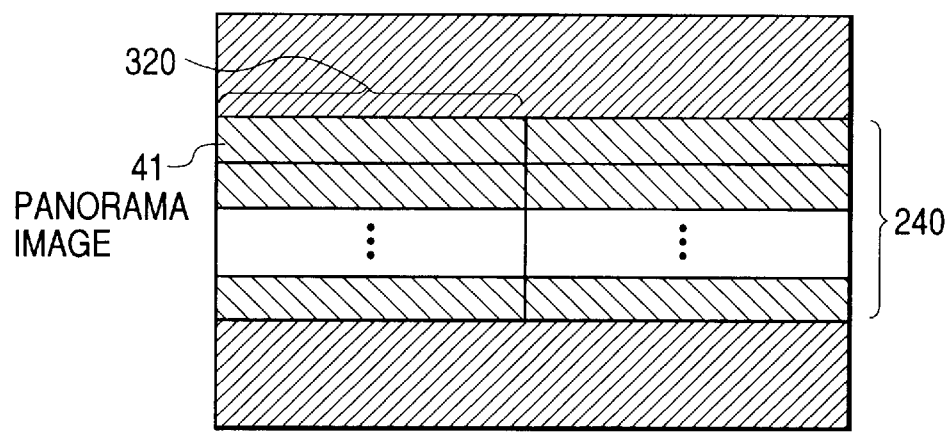
FIGS. 4A, 4B and 4C are views showing a panoramic image generated by the process circuit 26.
Figure 4B:
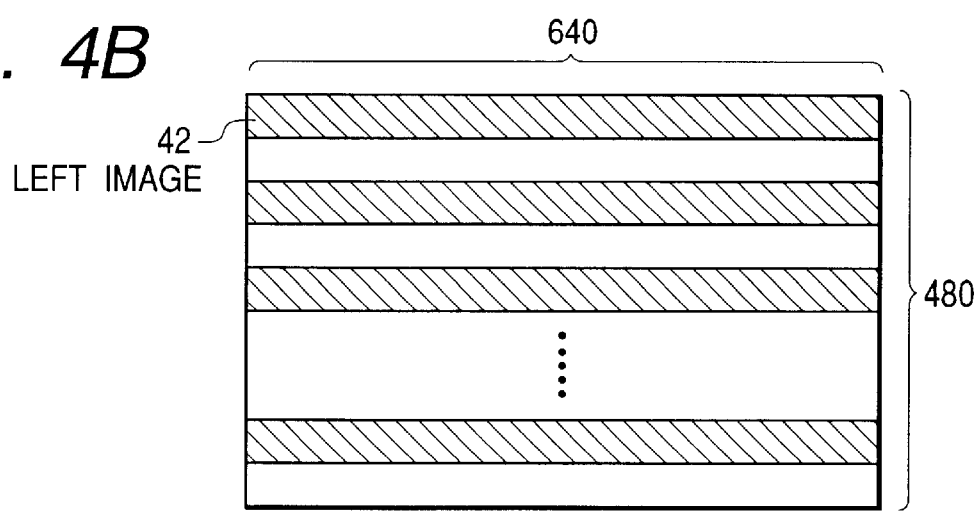
Figure 4C:
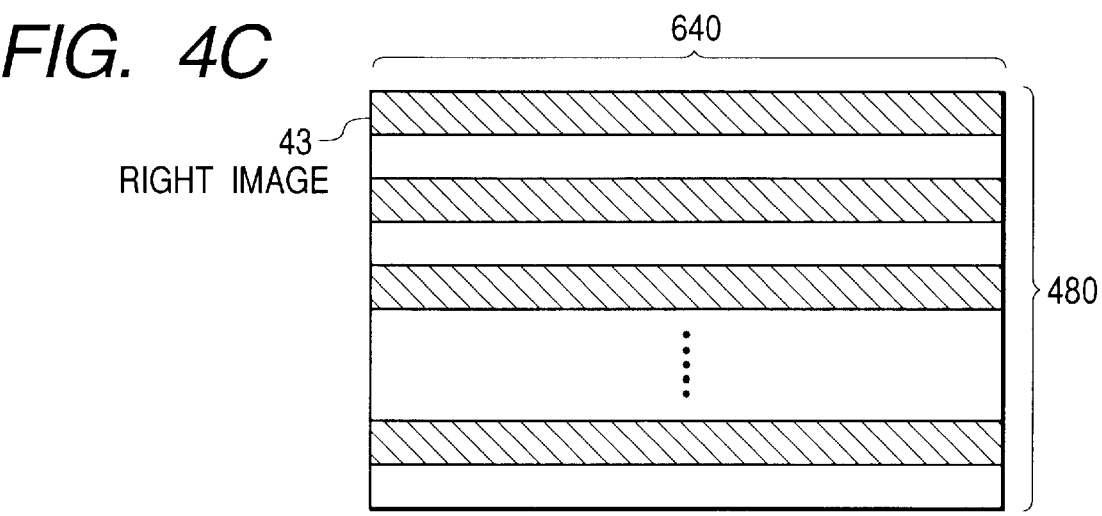

FIGS. 4A to 4C illustrate a panoramic image generated by the process circuit 26, wherein shown are a panoramic image 41 in the VRAM a left image 42 and a right image 43. As the left image 42 and the right image 43 have slight overlapping area, a panoramic image can be prepared by arranging these images at left and at right, in such a manner that they mutually overlap at such overlapping area. FIGS. 4A to 4C conceptually show thus prepared panoramic image 41.

As an example, in case each of the left image 42 and the right image 43 has an image size of 640 (horizontal)×480 (vertical) pixels, and the liquid crystal display 14 is also capable of displaying 640×480 pixels, both the left image 42 and the right image 43 have to be reduced to half in the horizontal and vertical directions, in order to display the panoramic image on the liquid crystal display 14.

Such reduction can be achieved, for example, by pixel thinning out or by picking up the average of the values of the adjacent pixels. In the present embodiment, the image size is halved in the horizontal and vertical directions by picking up the average of the values of the adjacent pixels in the horizontal direction and by executing pixel thinning-out in the vertical direction, and the panoramic image 41 shown in FIGS. 4A to 4C can be obtained by arranging such reduced images in such a manner that they mutually overlap at the overlapping area.

Now reference is made to FIG. 3 for explaining the method of writing the panoramic image into the VRAM at a rate same as the image picking up rate. The left and right digital image signals are processed in synchronization by the control signal from the timing generator 25, and are respectively outputted from the signal processing circuit 27, 207.

The switching unit 31 is initially connected as indicated by solid lines whereby the left digital signal 34 is compressed to a half in the horizontal direction in the horizontal compression unit 35 by the aforementioned method (averaging the values of the adjacent pixels), and is written into the VRAM 28 according to the addresses generated by the VRAM address generating unit 32.

Simultaneously, the right digital signal 304 is retained in the line memory 30 according to the addresses generated by the line memory address generating unit 33.

When the writing of a line of the left image is completed, the switching unit 31 is connected as indicated by a broken line, whereby the left signal 34 and the right signal 304 are not written into the VRAM 28. (In this state the left and right signals are thinned out.) The right signal 304 retained in the line memory 30 is read according to the addresses from the line memory address generating unit 33 and is supplied to the horizontal compression unit 35, and the data outputted therefrom are written into the VRAM 28 according to the addresses generated by the VRAM address generating unit 32.

In these operations, the VRAM address generating unit 32 controls the generated addresses according to whether the data written into the VRAM 28 are right signal or left signal or according to the size of overlapping area, whereby the panoramic image 41 shown in FIGS. 4A to 4C is retained in the VRAM 28.

After a line of the right image is read from the line memory 30, the switching unit 31 is again connected as indicated by the solid lines, whereby the left image 34 is written into the VRAM 28. By the repetition of these operations, the data thinning-out is executed in the vertical direction when the switching unit 31 is connected as indicated by the broken line whereby the data are compressed to a half in the vertical direction, while the data are compressed to a half in the horizontal direction by the horizontal compression unit 35, so that the data writing into the VRAM 28 is executed with a rate same as the image pickup rate.

Therefore, in the multi-lens image pickup apparatus of the present embodiment, the signals picked up with the CCD's 20, 200 are stored, by the process circuit 26, in the VRAM 28 as a panoramic image which can be displayed by the liquid crystal display 14. The panoramic image written into the VRAM 28 is displayed on the liquid crystal display 14 through the liquid crystal display controller 29. Thus the observer can observe the panoramic image on the liquid crystal display 14 at a rate same as the image pickup rate.

FIG. 5 illustrates the external view of a multi-lens image pickup apparatus constituting a second embodiment, and the structure of a display device employed therein, wherein shown are a main body 51 of the multi-lens image pickup apparatus provided with a liquid crystal display device capable of stereoscopic display, a left image pickup system 52, a right image pickup system 53, and a liquid crystal display device 54 provided with components 55 to 61 shown in a magnified manner.

There are also shown a rear light source 55, a checker-patterned aperture mask 56, lenticular lenses 57, 58, a polymer dispersed liquid crystal (PDLC) 59, a display pixel unit 60 composed of a liquid crystal layer etc., and a glass substrate 61. Omitted from the illustration are polarizing plates, color filters, electrodes, a black mask, an antireflective film etc. Other components are same as those in the foregoing first embodiment so that they are represented by same numbers and will not be explained further.

In the present embodiment, in contrast to the foregoing first embodiment, the optical axes of the left and right image pickup systems 52, 53 are not arranged in outwards diverging manner but in converting or parallel manner, in order to pick up images that can be observed stereoscopically, and the liquid crystal display 54 is capable of stereoscopic display, so that the observer can observe, by the liquid crystal display 54, a stereoscopic image instead of the panoramic display at a rate same as the image pickup rate.

The liquid crystal display 54 capable of stereoscopic display is constructed in the following manner. The display pixel unit 60 (image displaying liquid crystal device) composed of a liquid crystal layer is formed between the glass substrates 61. In front of the illuminating rear light source 55, there is provided a mask substrate 56 having checker-patterned light-transmitting apertures.

The mask pattern is formed with an evaporated metal film such as of chromium or a light absorbing material, and is prepared by patterning on a glass or resinous mask substrate. Between the mask substrate 56 and the liquid crystal display device 60, there are provided transparent glass or resinous lenticular lenses 57, 58 in a mutually perpendicular manner so as to constitute microlenses.

Also between the lenticular lens 58 and the liquid crystal display device 60, there is provided the PDLC 59. The liquid crystal display device 60 displays the images obtained from the left and right image pickup systems 52, 53 in horizontal stripes alternating in the vertical direction. The light from the rear light source 55 passes through the apertures of the mask substrate 56, then the lenticular lenses 57, 58 and the PDLC 59 and illuminates the liquid crystal display device 60, whereby the above-mentioned images are observed, as left and right images with a parallax, by the observer. Thus the observer can observe a stereoscopic image. In this state the PDLC 59 is given an electric field and is in a transparent state, whereby the light directed by the mask substrate 56 and the lenticular lenses 57, 58 illuminates the liquid crystal display device 60 while maintaining its directionality, in such a manner that the images are separated and observed respectively by the eyes of the observer.

Figure 6:
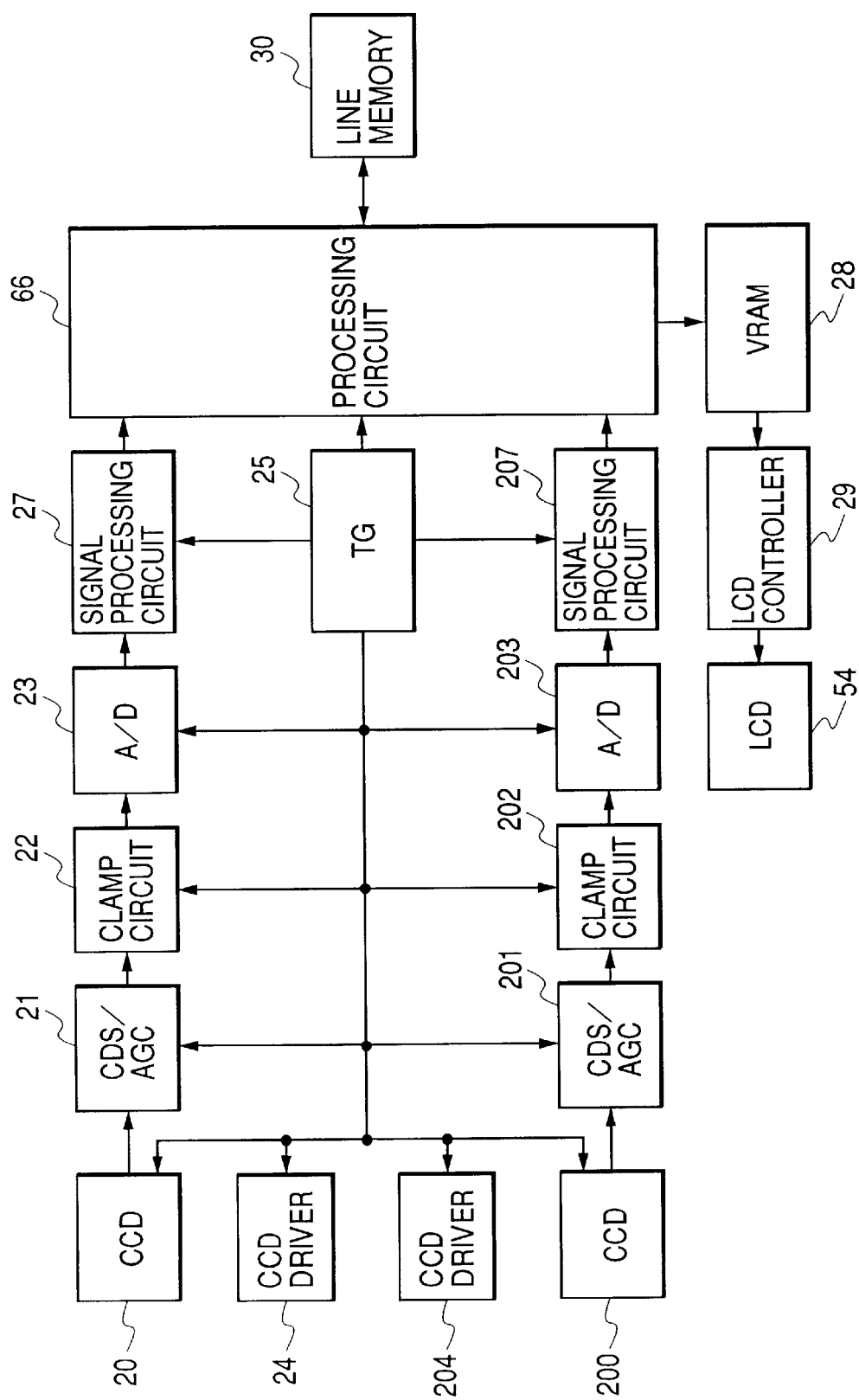
FIG. 6 is a block diagram showing the configuration of the multi-lens image pickup apparatus of the second embodiment.

FIG. 6 is a block diagram showing the configuration of the multi-lens image pickup apparatus of the second embodiment, wherein a process circuit 66 executes a process different from that in the process circuit 26 of the first embodiment. As the process from the image pickup to the signal processing circuit 27, 207 is same as in the first embodiment, the components are given same numbers as in the first embodiment and will not be explained further.

FIG. 7 is a block diagram showing the configuration of the process circuit 66, wherein provided is a VRAM address generating unit 72. The process circuit 66 is same as in the first embodiment (cf. FIG. 3) except that the horizontal compression unit is omitted.

Figure 8A:
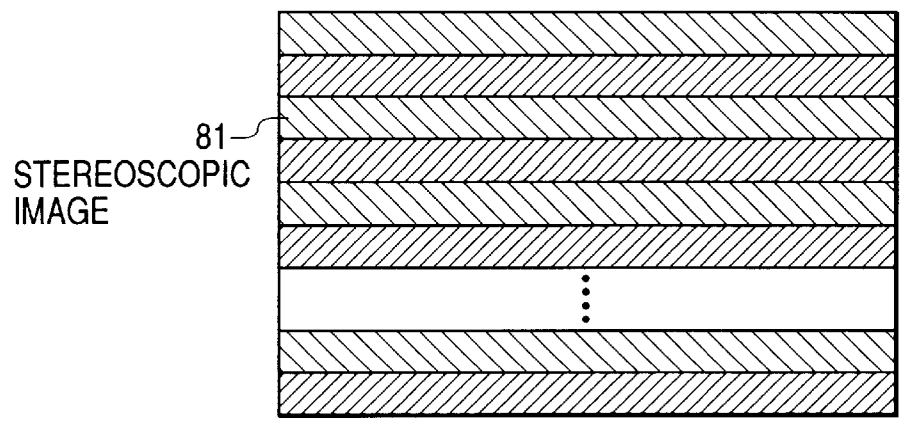
FIGS. 8A, 8B and 8C are views showing a stereoscopic image generated by the process circuit 66.
Figure 8B:
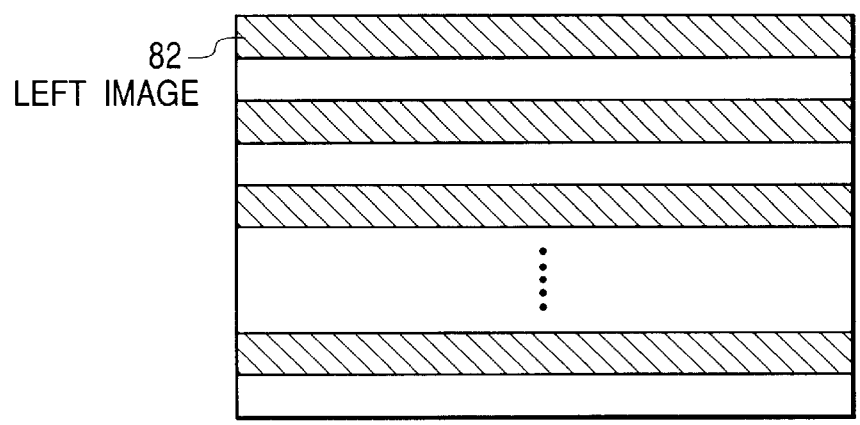
Figure 8C:
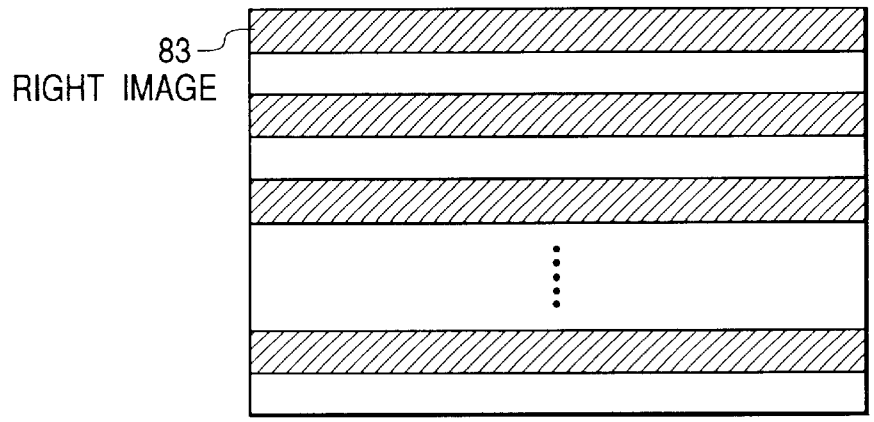

FIGS. 8A to 8C illustrate a stereoscopic image generated by the process circuit 66, wherein shown are a stereoscopic image 81 in the VRAM, a left image 82, and a right image 83. In order to display the stereoscopic image on the liquid crystal display 54, an interlaced image 81 has to be synthesized from the left and right images 82, 83.

As an example, in case each of the left image 82 and the right image 83 has an image size of 640 (horizontal)×480 (vertical) pixels, and the liquid crystal display 54 is also capable of displaying 640×480 pixel, both the left image 82 and the right image 83 have to be reduced to half in the vertical directions and arranged in horizontal stripes alternating in the vertical direction, in order to display the stereoscopic image on the liquid crystal display 54. Such reduction can be achieved for example by data thinning-out. In the present embodiment, the image size is reduced to a half in the vertical direction by thinning-out every other line, and the stereoscopic image is prepared by alternately arranging thus thinned-out images.

Now reference is made to FIG. 7 for explaining the method of writing the stereoscopic image into the VRAM at a rate same as the image pickup rate. The left and right digital image signals are processed in synchronization by the control signal from the timing generator 25, and are respectively outputted from the signal processing circuit 27, 207.

The switching unit 31 is initially connected as indicated by solid lines whereby the left digital signal 34 is written into the VRAM 28 according to the addresses generated by the VRAM address generating unit 72. Simultaneously, the right digital signal 304 is retained in the line memory 30 according to the addresses generated by the line memory address generating unit 33.

When the writing of a line of the left image is completed, the switching unit 31 is connected as indicated by a broken line, whereby the left signal 34 and the right signal 304 are not written into the VRAM 28. (In this state the left and right signals are thinned out.) The right signal 304 retained in the line memory 30 is read according to the addresses from the line memory address generating unit 33 and is written into the VRAM 28 according to the addresses generated by the VRAM address generating unit 72.

In these operations, the VRAM address generating unit 72 controls the generated addresses according to whether the data written into the VRAM 28 are right signal or left signal, whereby the striped stereoscopic image 81 shown in FIG. 8A is retained in the VRAM 28.

The stereoscopic image written into the VRAM 28 is displayed on the liquid crystal display 54 through the liquid crystal display controller 29. Thus the observer can observe the stereoscopic image on the liquid crystal display 54 at a rate same as the image pickup rate.

It is also possible to switch the system to the panoramic image pickup by changing the direction of the left and right image pickup images 52, 53 from the converging or parallel arrangement to the diverging arrangement. Also the addresses generated by the VRAM address generating unit 72 for data writing into the VRAM 72 may be changed to those for panoramic image or those for stereoscopic image according to the direction of the image pickup systems, and the liquid crystal display 54 may be used for observing both the stereoscopic image and the panoramic image. In case of the panoramic image, the PDLC 59 is not given the electric field in contrast to the case of the stereoscopic image, whereby the illuminating light with directionality is scattered again by the liquid crystal molecules in the PDLC 59 and illuminates the liquid crystal display device 60 without the directionality. Thus the left and right images are not separated but observed as a two-dimensional image.

FIG. 9 is a block diagram showing the configuration of a multi-lens image pickup apparatus constituting a third embodiment. The multi-lens image pickup apparatus of the third embodiment is constituted by eliminating the line memory 30 from the multi-lens image pickup apparatus of the foregoing first embodiment (cf. FIG. 2) and replacing the process circuit 26 with a process circuit 96 for a different process. Other components are same as those in the foregoing first embodiment, so that they are numbered same as in the first embodiment and will not be explained further.

FIG. 10 is a block diagram showing the configuration of the process circuit 96, which is same as the process circuit shown in FIG. 3, except that the line memory address generating unit and the horizontal compression unit are dispensed with.

Now there will be explained the method of writing the panoramic image into the VRAM 28 at a rate same as the image pickup rate. As in the first embodiment, the left and right digital image signals 34, 304 are processed in synchronization by the control signal from the timing generator 25, and are therefore simultaneously outputted from the signal processing circuit 27, 207.

The switching unit 101 is initially connected as indicted by solid lines whereby the left digital signal 34 is written into the VRAM 28 according to the addresses generated by the VRAM address generating unit 32. At the next pixel, the switching unit 101 is connected as indicated by a broken line, whereby the right signal 304 is written into the VRAM 28 according to the address generated by the VRAM address generating unit 32. In this manner the left signal and the right signal are alternately written into the VRAM 28 by every pixel, whereby the data are compressed to a half in the horizontal direction to generate a panoramic image. When the writing of a line is completed, the left and right signals are not written into the VRAM 28 for the compression in the vertical direction, and the writing operation is started again in the next line, and these operations are repeated.

In these operations, the VRAM address generating unit 32 controls the generated address according to whether the data written into the VRAM 28 is right signal or left signal, thereby generating the panoramic image.

In this manner the observer can observe the panoramic image on the liquid crystal display 14 at a rate same as the image pickup rate. Also the stereoscopic image shown in the foregoing second embodiment can be prepared without the use of the line memory. In this case, the left and right signals are not alternated by every pixel but by every line for achieving compression to a half in the vertical direction, in order to obtain the stereoscopic image.

FIG. 11 is a block diagram showing the configuration of a multi-lens image pickup apparatus constituting a fourth embodiment, which is constituted by replacing the line memory 30 of the foregoing first embodiment with image memories A110, B111, C112 and D113 and the process circuit 26 with a process circuit 116 of a difference process. As other components are same as in the foregoing first embodiment, they are numbered same as therein and will not be explained further.

Figure 12:
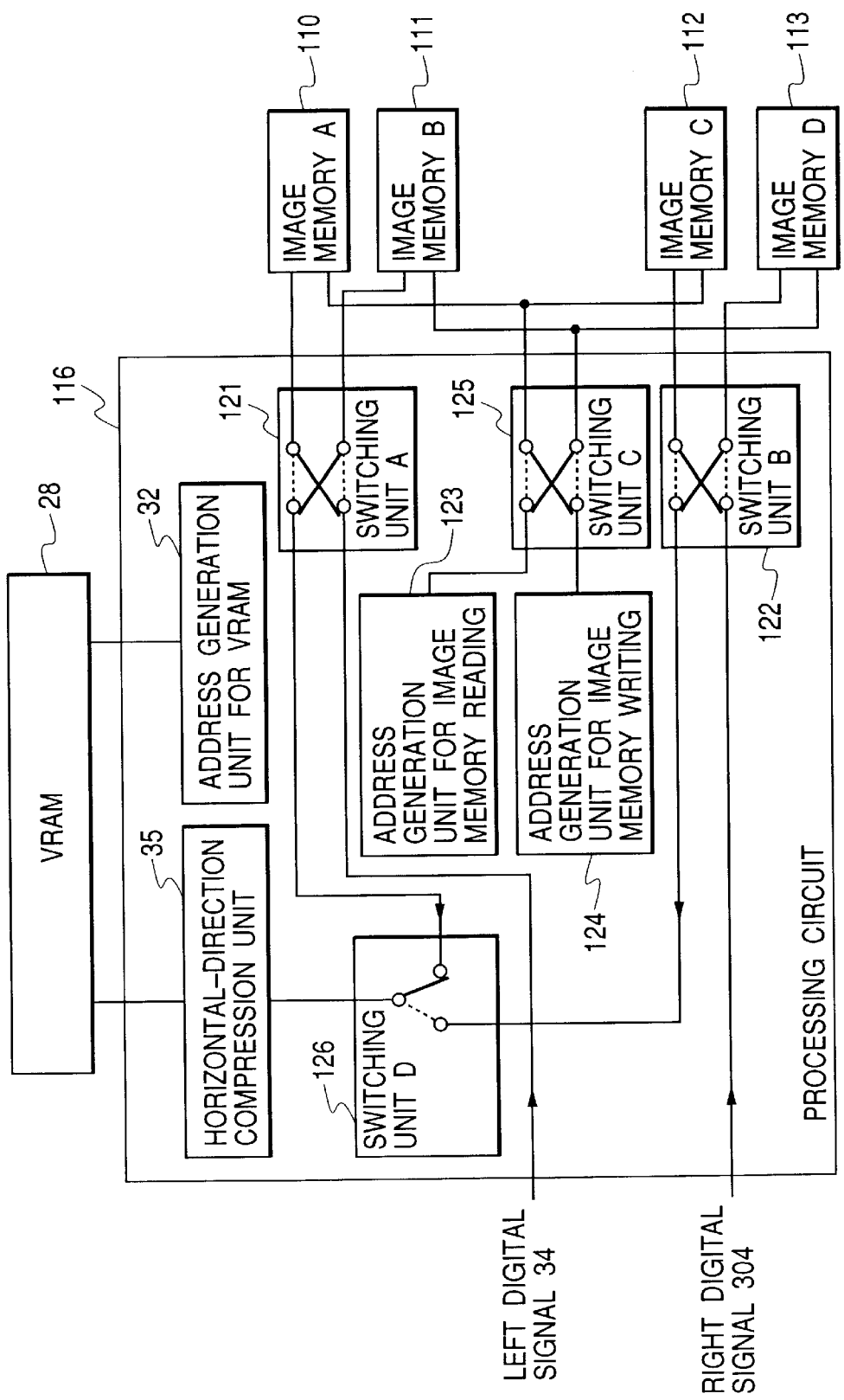
FIG. 12 is a block diagram showing the configuration of a process circuit 116.

FIG. 12 is a block diagram showing the configuration of the process circuit 116, wherein provided are switching units A121 and B122, an image memory readout address generating unit 123, an image memory write-in address generating unit 124, switching units C125 and D126, and other components are same as those in the foregoing first embodiment.

Now there will be explained the method of writing the panoramic image into the VRAM 28 at a rate same as the image pickup rate. The left and right digital image signals 34, 304 are processed in synchronization by the control signal from the timing generator 25, and are therefore simultaneously outputted from the signal processing circuit 27, 207.

The switching units A121, B122 and C123 are initially connected as indicated by solid lines whereby the left digital signal 34 is written into the image memory A110 according to the addresses generated by the image memory write-in address generating unit 124. Similarly the right image 304 is stored in the image memory C112 according to the addresses generated by the image memory write-in address generating unit 124.

In this state, as the left image and the right image of the immediately preceding image frame are retained in the image memories B111 and D113, the image signals are at the same time read therefrom according to the addresses generated by the image memory readout address generating unit 123, thereby synthesizing a panoramic image in the VRAM 28.

As the switching unit D126 is connected as indicated by solid lines, the image data are read from the image memory B111 according to the addresses generated by the image memory readout address generating unit 123 and are supplied to the horizontal compression unit 35, and the data outputted therefrom are written into the VRAM 28 according to the addresses generated by the VRAM address generating unit 32.

When the reading of the image memory B111 is completed, the switching unit 126 is connected as indicated by a broken line, and the image data are read from the image memory D113 according to the addresses generated by the image memory readout address generating unit 123 and are supplied to the horizontal compression unit 35. The data outputted therefrom are written into the VRAM 28 according to the addresses generated by the VRAM address generating unit 32.

In this manner the image is compressed in the horizontal direction by the horizontal compression unit 32 and in the vertical direction by reading every other line of the image at the readout from the image memory. Thus, within the write-in time of the left and right image signals 34, 304 into the image memories, the left and right image signals of the immediately preceding image frame are read and synthesized into the panoramic image.

In these operations, the VRAM address generating unit 32 controls the generated addresses according to whether the data to be written into the VRAM 28 are right or left signal and according to the overlapping area size, in such a manner that a panoramic image as shown in FIG. 4A is retained.

When the writing of the left and right image signals 34, 304 into the image memories A110, C112 is completed, the switching units A121, B122 and C125 are connected as indicated by broken lines whereby the left and right image signals 34, 304 are written into the image memories B111 and D113, and the switching unit D is connected as indicated by solid lines to effect the data reading from the image memory C112 thereby preparing a panoramic image in the VRAM 28.

The above-described switching of the connections of the switching units allows to display a panoramic image on the liquid crystal display 14 at a rate same as the image pickup rate. Also the switching units can be operated slower in comparison with the foregoing first and third embodiments. Further, a similar method may be employed for preparing a stereoscopic image as in the second embodiment. In such case the horizontal compression unit is unnecessary, and a stereoscopic image compressed to a half in the vertical direction can be prepared by alternated writing, by every line, into the VRAM.

Figure 13B:
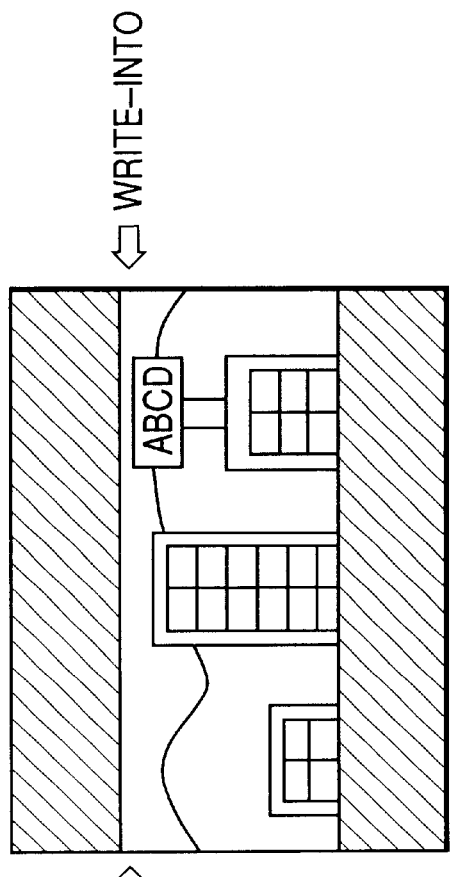
FIGS. 13A and 13B are views showing a method of correcting a mirror inverted image.
Figure 13A:
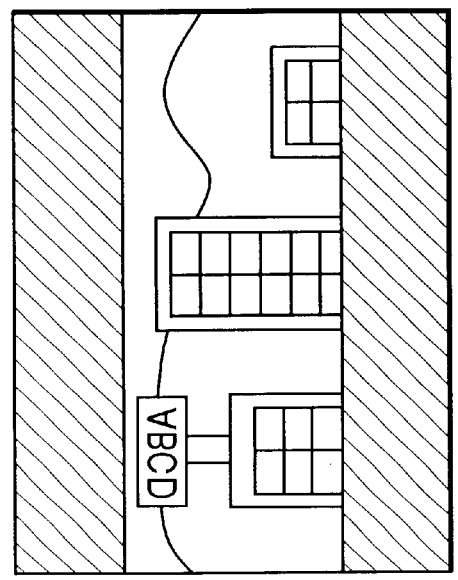

Also in case the image pickup system is of a configuration employing an odd number of mirrors (cf. the Japanese Patent Application No. 8-304670), the image outputted therefrom is laterally inverted and has therefore to be corrected. FIGS. 13A and 13B show a method of correcting such mirror-inverted image. The mirror-inverted image shown in FIG. 13A can be corrected as shown in FIG. 13B by inverting the direction of the data writing into the image memory in comparison with that of the data reading.

More specifically, as the data reading from the CCD is conducted from left to right, the mirror-inverted image can be corrected by controlling the image memory write-in address generating unit 124 so as to effect the writing from right to left and the image memory-readout address generating unit 123 so as to effect the reading from left to right. As an alternative, the correction of the mirror-inverted image can also be achieved by writing from left to right and reading from right to left. Furthermore, such correction of the mirror-inverted image can also be achieved by utilizing the line memory 30 in the foregoing first embodiment.

Figure 14:
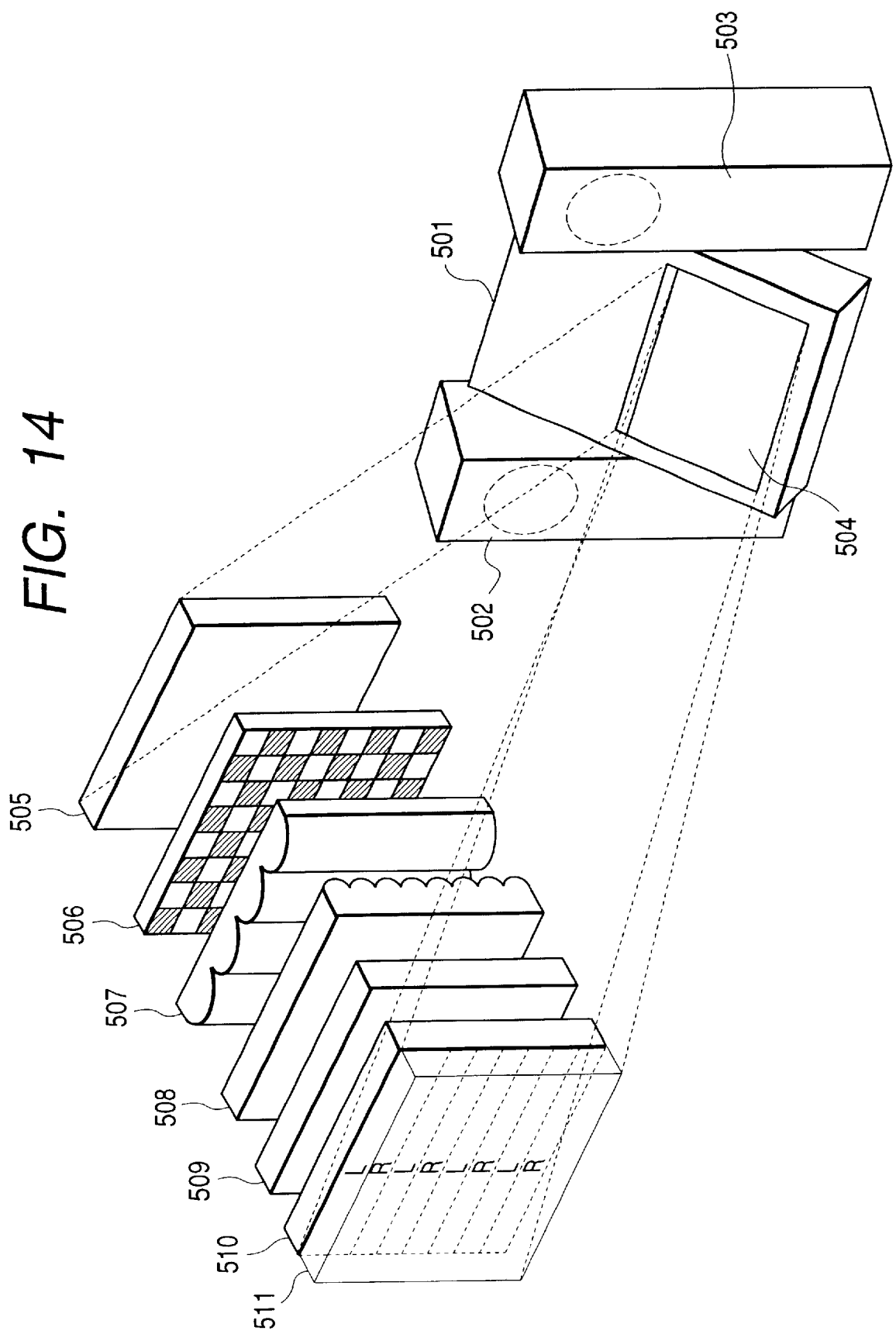
FIG. 14 is a view showing the external view of a multi-lens image pickup apparatus constituting a fifth embodiment and the structure of a display device therein.

FIG. 14 is a view showing the external view of a multi-lens image pickup apparatus in a fifth embodiment and the structure of the display device wherein shown are a main body 501 of the multi-lens image pickup apparatus, left and right image pickup systems 502, 503, and a display device (liquid crystal display) capable of stereoscopic display, with components 505 to 510 illustrated in a magnified manner.

There are also shown a rear light source 505, a checker-patterned aperture mask 506, lenticular lenses 507, 508, a polymer dispersed liquid crystal (PDLC) 509, a display pixel unit 510 composed of a liquid crystal layer etc., and a glass substrate 511. Omitted from the illustration are polarizing plates, color filters, electrodes a black mask, an anti-reflective film etc.

The multi-lens image pickup apparatus is composed of the above-mentioned main body 501, and left and right image pickup systems 502, 503 provided respectively with lenses. In order to obtain the stereoscopic effect of the image, the image pickup systems 502, 503 are positioned, in the stereoscopic image pickup m ode, at the left and right ends of the main body 501 of the multi-lens image pickup apparatus, thereby providing a long baseline length.

On the rear face of the main body 501, there is provided the display device 504 allowing stereoscopic observation of the images obtained from the left and right image pickup optical systems 502, 503.

At the image pickup operation, the photographer can stereoscopically observe the stereoscopic images picked up with the two image pickup optical systems 502, 503, by means of the display device 504 capable of stereoscopic display. In this operation, the display device 504 can be adjusted to a tilted direction matching the observer, relative to the image pickup optical systems 502, 503, as shown in FIG. 14. The relative positional relationship of the two image pickup optical systems 502, 503 is fixed and remain unchanged when the display device 504 is rotated into the tilted position.

The observation of the stereoscopic image by the display device 504 at the image pickup operation or at the image playing operation after the image pickup operation is rendered possible by transferring a stereoscopic image signal to the display device 504 from a memory medium provided in the main body 501 of the multi-lens image pickup apparatus.

In the display device 504, the liquid crystal display 510 for image display is provided inside the glass substrate 511. In front of the illuminating rear light source 505, there is provided a mask substrate 506 having checker-patterned light-transmitting apertures.

The mask pattern is formed with an evaporated metal film such as of chromium or a light absorbing material, and is prepared by patterning on a glass or resinous mask substrate. Between the mask substrate 506 and the liquid crystal display 510, there are provided transparent glass or resinous lenticular lenses 507, 508 in a mutually perpendicular manner so as to constitute microlenses.

Also between the lenticular lens 508 and the liquid crystal display 510, there is provided the PDLC 509. The liquid crystal display 510 displays the images obtained from the left and right image pickup systems 502, 503 in horizontal stripes alternating in the vertical direction.

The light from the rear light source 505 passes through the apertures of the mask substrate 506, then the lenticular lenses 507, 508 and the PDLC 509 and illuminates the liquid crystal display 510, whereby the above-mentioned images are separated and observed, as left and right images with a parallax, by the observer.

Thus the observer can observe a stereoscopic image. In this state the PDLC 509 is given an electric field and is in a transparent state, whereby the light directed by the mask substrate 506 and the lenticular lenses 507, 508 illuminates the liquid crystal display 510 while maintaining its directionality, in such a manner that the images are separated and observed respectively by the eyes of the observer.

Figure 15:
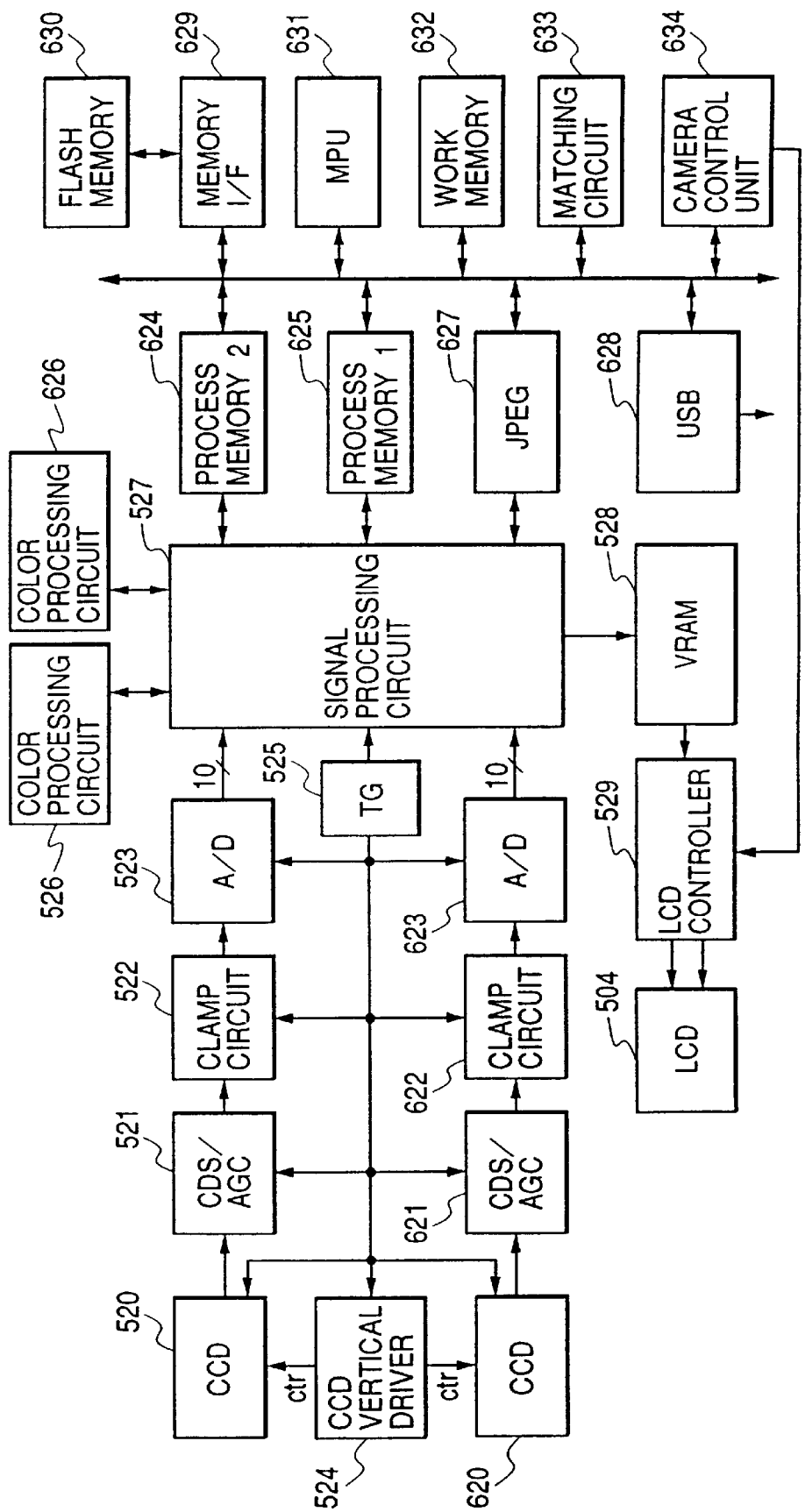
FIG. 15 is a block diagram showing the configuration of a multi-lens image pickup apparatus.

In the following there will be explained, with reference to FIG. 15, the flow of signals and processes in the camera at the stereoscopic image pickup. FIG. 15 is a block diagram showing the configuration of the multi-lens image pickup apparatus, wherein shown are CCD's 520, 620, a vertical CCD driver 524, and CDS/AGC circuits 521, 621.

There are also shown clamp circuits 522, 622, A/D converters 523, 623, a timing generator (TG) 525, a signal processing circuit 527, a VRAM 528, and a liquid crystal display control circuit 529.

There are further provided a liquid crystal display 504 similar to that shown in FIG. 14, memories 624, 625 (process memories 1, 2), a compression/expansion circuit 627 effecting for example JPEG compression, a digital interface 628 such as USB, a memory interface 629, and a memory medium 630. The present embodiment employs a flush memory as the memory medium. There are further provided an MPU 631, a work memory 632, a matching circuit 633, and a camera control unit 634.

At first, when the operator inputs an instruction such as image recording or playing operation into the camera control unit 634, a corresponding signal is sent therefrom to the MPU 631, which is response controls various units. In the following it is assumed that the stereoscopic image pickup mode is selected.

The images formed by the two image pickup optical systems 502, 503 are focused on the CCD's 520, 620 for photoelectric conversion, then transmitted through the CDS/AGC circuits 521, 621 and the clamp circuits 522, 622 and converted into digital signals by the A/D converters 523, 623.

As the left and right image signals are processed in synchronization according to the control signals from the vertical CCD driver 524 and the timing generator 525, the images picked up at the same time are processed simultaneously.

The CCD's 520, 620 have a frame capture mode and a field capture mode, and, in the present embodiment, there will be explained the frame capture mode, in which the frame capture image in the CCD is read by progressive scanning (reading by every line).

The left and right images converted into the digital signals by the A/D converters 523, 623 are supplied by the signal processing circuit 527 respectively to color processing circuits 526, 626 in which the digital signals are subjected to a color conversion process etc.

After the color conversion process, the left and right digital signals are entered again into the signal processing circuit 527, then converted into the pixel number of the liquid crystal display, and the left and right images are synthesized by alternating every horizontal line. The synthesized image data are transferred to the VRAM 528.

At the same time, the image data are also stored in the process memories 624, 625. The signal processing circuit 527 thus controls the signals in both directions. At this point, the signals picked up with the CCD's 520, 620 are stored in the process memories 624, 625 and the VRAM 528.

In order to generate the stereoscopic image signal in the liquid crystal display 504 of the multi-lens image pickup apparatus, there is utilized the content of the VRAM 528, which constitutes a display memory and has a capacity enough for displaying the image on the liquid crystal display 504.

As the number of pixels of the images retained in the process memories 624, 625 is not necessarily equal to that of the liquid crystal display 504, the signal processing circuit 527 is provided with a function for thinning out or interpolating the pixels.

The left and right images stored in the VRAM 528 are displayed, alternately by every line, on the liquid crystal display 504 through the liquid crystal display control circuit 529, whereby the observer can observe a stereoscopic image.

Figure 16:
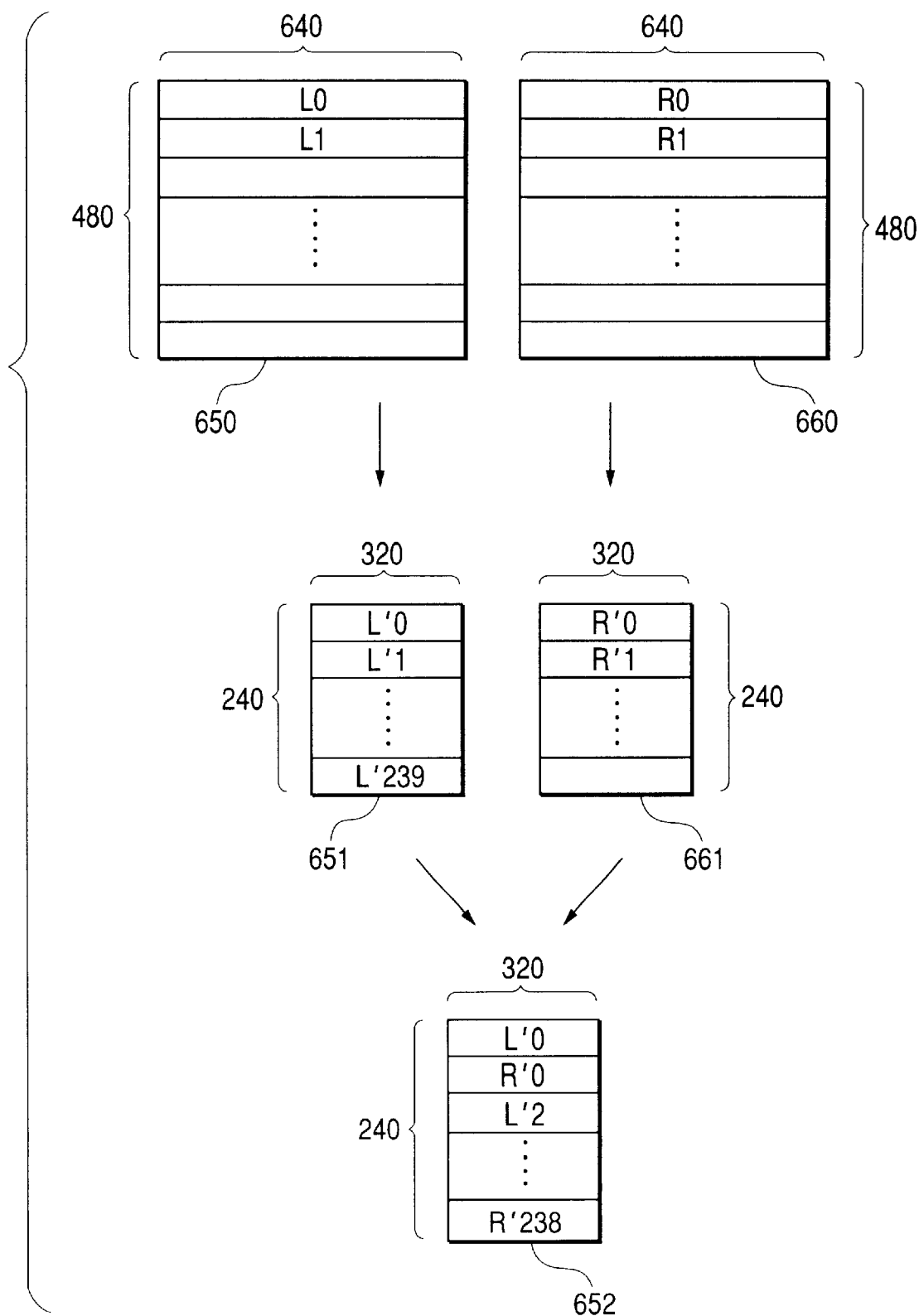
FIG. 16 is a view showing the procedure of generating a synthesized image.

FIG. 16 shows the method of generating the synthesized image, wherein shown are images 650, 660 respectively picked up by the CCD's 520, 620; images 651, 661 compressed to 1/2 both in the vertical and horizontal directions; and an interlace synthesized image 652. Each of the CCD's 520, 620 has an effective pixel number of 640×480 pixels per frame while the liquid crystal display 504 has a display pixel number of 320×240 pixels.

Each of the left and right images focused on the CCD's 520, 620 by the image pickup optical systems 502, 503 is subjected to color conversion in the form of digital signal, and has 640×480 effective pixels (consisting of L0, L1, . . . , L479 and R0, R1, . . . , R479).

These signals are stored in the process memories 624, 625 through the signal processing circuit 527, and the left and right images 650, 660 are also converted therein into images 651, 661 of a size of 320×240 dots (consisting of L'0, L'1, . . . , L'239 and R'0, R'1, . . . , R'239) matching the size of the LCD. Such conversion may be achieved either by simple thinning out or by interpolation.

The left and right images 651, 661 converted into the size of 320×240 dots are synthesized by every line, in the order of L'0, R'0, L'2, R'2, . . . , R'238, and the synthesized image is written into the VRAM 528.

Also in response to the selection of the stereoscopic image pickup mode by the operator through the camera control unit 634, such mode is transmitted to the LCD control circuit 529, which in response applies an electric field to the polymer dispersed liquid crystal 509. In this manner the LCD control circuit 529 outputs two signals, namely the image display signal and the control signal for the PDLC 509, thereby enabling stereoscopic observation.

In the following there will be explained the recording operation of the images. The recording medium can be composed for example of a magnetic tape, a magnetic disk, an optical disk, a semiconductor memory etc., but the present embodiment employs a flush memory.

The memory interface 629 stores the stereoscopic image signal as a digital format file in an empty area of the flush memory (recording medium) 630, and registers a file management area. The recording operation is initiated in response to the entry of a desired operation by the photographer in the camera control unit 634. When the MPU 631 identifies an image pickup instruction, the data of the process memories 624, 625 are transferred, that of the memory 624 being first, through the signal processing circuit 527, to the compression/expansion circuit 627 for compressing the data, and the compressed data is stored in the work memory 632.

Similarly the data of the process memory 625 is transferred through the signal processing circuit 527 to the compression/expansion circuit 627 for compressing the data, and the compressed data is stored in the work memory 632. In the present embodiment, the JPEG compression is employed.

The compressed data stored in the work memory 632 are given file names such as s001L.jpg, s001R.jpg for paired file management of the left and right compressed images.

In this operation, identification information for identifying the paired images is simultaneously recorded in the file management area. Also there is recorded a thumbnail image together with the main image. The thumbnail image means a reduced image, for example of a size of 80×60 pixels, in comparison with the main image.

Such thumbnail image is formed, as in the compression of the main image, by reducing the data of the process memory 624 to the size of 80×60 pixels through the signal processing circuit 527 and then compressing the data by the compression/expansion circuit 627. The compressed data are stored in the work memory 632.

Similarly the data of the process memory 625 is reduced through the signal processing circuit 527 and then the data is compressed by the compression/expansion circuit 627, and the compressed data are stored in the work memory 632. The JPEG compression is employed also for this operation.

The compressed data stored in the work memory 632 are given file names such as ss001L.jpg, ss001R.jpg for paired file management of the left and right compressed images. In this operation, identification information for identifying the paired images is simultaneously recorded in the file management area as in the case of original images.

The stereoscopic image recording is executed in the above-described flow, and the operator can execute the recording operation only when desired, while observing a stereoscopic image on the liquid crystal display. In this manner the freedom of image pickup operation is widened, and the operator can confirm the image with stereoscopic feeling, even when the camera is moved in the course of the image pickup operation.

In the following there will be explained the playing operation of the stereoscopic image recorded in the recording medium (flush memory) 630. As the recording medium contains plural stereoscopic image files, the memory I/F 629 at first investigates the file management area of the recording medium 630, and sends data on the image file registrations to the MPU 631.

The MPU 631 selects an image file that can be played as a stereoscopic image, then transforms the data of the corresponding image file name into an arbitrary display format, and reads the thumbnail image corresponding to such image file from the recording medium 630 and stores it in the work memory 632.

Figure 17:
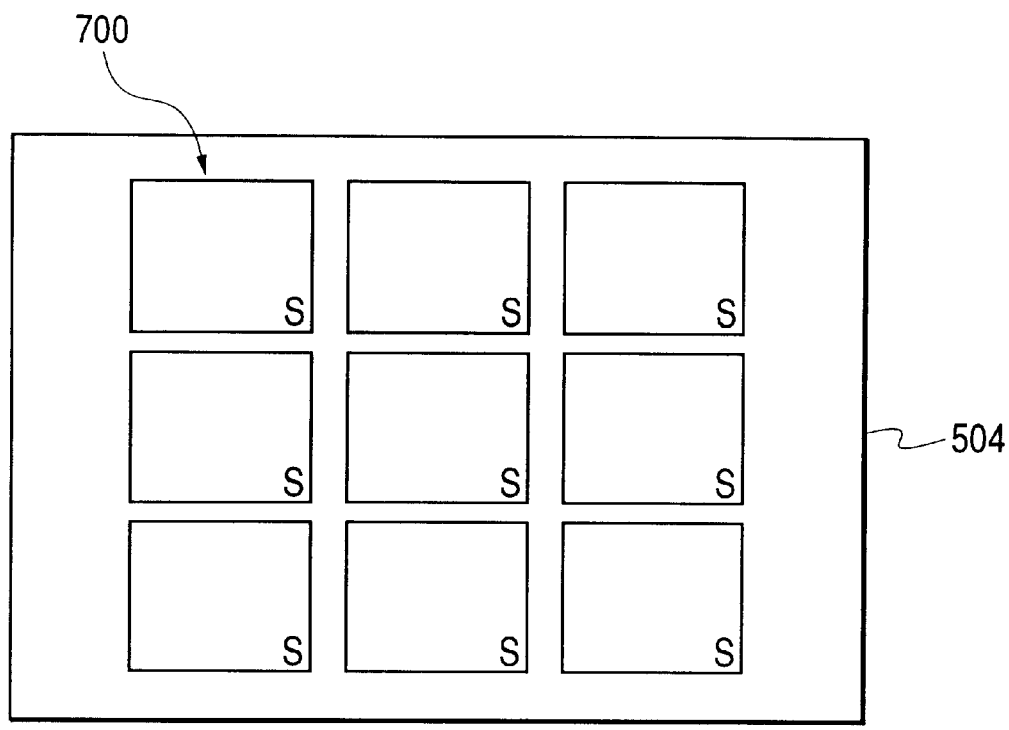
FIG. 17 is a view showing the display state of thumbnail images.

As the thumbnail images stored in the work memory 632 are JPEG compressed, 9 thumbnail images are selected and transmitted to the signal processing circuit 527, and displayed on the liquid crystal display 504. In this state, the liquid crystal display 504 is in a two-dimensional display mode, and flag information indicating the stereoscopic image is displayed together with the thumbnail image. Within the thumbnail images prepared as a pair, either one is used for display. FIG. 17 shows the display state of the thumbnail images.

In FIG. 17, there are shown thumbnail images 700 (for example left thumbnail images), accompanied by flags S indicating the stereo scopic image. Based on the displayed thumbnail images, the operator selects an image file to be reproduced and enters an instruction into the camera control unit 634.

The entered signal is transferred from the camera control unit 634 to the MPU 631 whereby the data of the selected file are read, by the memory I/F 629, from the recording medium 630 and are transferred to the work memory 632.

Then the data of the work memory 632 is expanded by the compression/expansion circuit 627 and is transferred to the process memories 624, 625. Thereafter executed are size conversion into the size of the VRAM 528 and interlaced synthesis, and a stereoscopic image is displayed on the liquid crystal display 504.

As explained above, the picked up stereoscopic image can be simply played. It is also possible to obtain stereoscopic effect on the sound in addition to the image, by providing microphones (not shown) together with the image pickup optical systems.

In the following there will be explained, as a sixth embodiment, the ordinary process of panoramic image pickup and playing operation. The arrangement of the image pickup optical systems is different from that in the stereoscopic image pickup mode. Since the arrangement of the image pickup optical systems in the panoramic image pickup is disclosed in the Japanese Patent Application No. 8-304669 of the present applicant, and the method of image synthesis is disclosed in the Japanese Patent Application No. 8-206455 and the Japanese Patent Laid-open Application Nos. 6-141237 and 6-217184, they will not be explained further in details. In the following description the multi-lens image pickup apparatus is assumed to be in a state in which the operator has instructed the panoramic image pickup mode to the camera control unit 634.

A matching circuit 633 is utilized for detecting the overlapping area size of the left and right images, for the synthesis thereof. The signal processing is same as in the stereoscopic image pickup, up to the supply of the image signal to the color processing circuits 526, 626.

However the signal processing is different in the image synthesis with storage in the process memories 624, 625 and in the data thinning-out or interpolation at the transfer to the VRAM 528. As the two images are displayed with spatial synthesis, they are reduced in the vertical direction in order to match the area of the liquid crystal display 504.

As an example, each of the left and right images is reduced to a size of 160×120 pixels, and, if the overlapping area size is for example zero, the two images are simply arranged side-by-side to obtain a panoramic image of 320× 120 pixels, which is written into the VRAM 528 and displayed on the liquid crystal display 504 by the liquid crystal control circuit 529.

Figure 18:
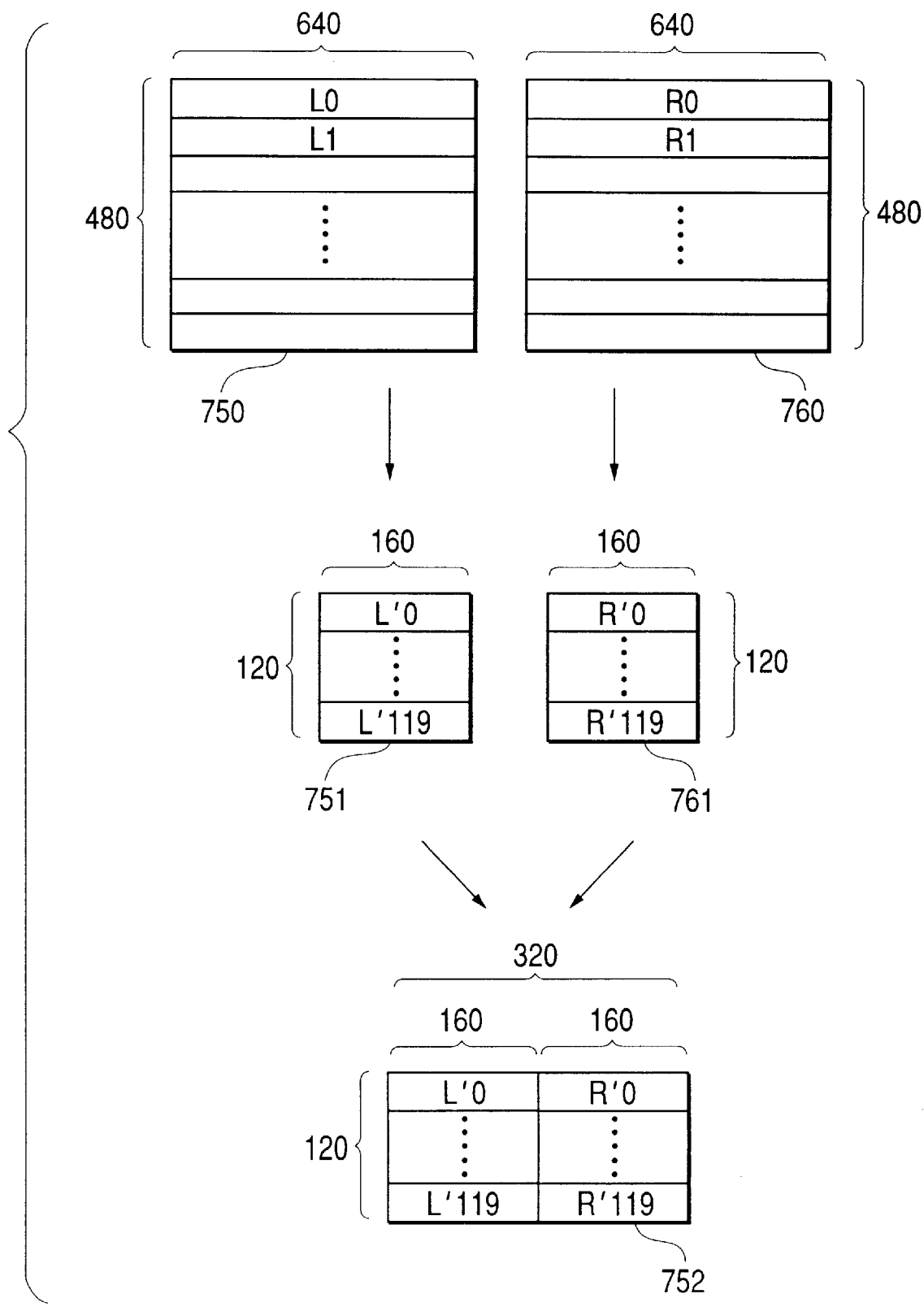
FIG. 18 is a view showing the procedure of generating a synthesized image in panoramic display.

FIG. 18 shows the procedure of generating a synthesized image at the panoramic display, wherein shown are images 750, 760 respectively picked up with the CCD's 520, 620; images 751, 761 reduced for panoramic synthesis; and a panoramic synthesized image 752 (showing a case of side-by-side synthesis without overlapping).

In this state, the operator has selected the panoramic display mode through the camera control unit 634, which transmits this mode to the liquid crystal control circuit 529, whereby the polymer dispersed liquid crystal 509 does not receive the electric field, in contrast to the stereoscopic display mode. Consequently, the illuminating light with directionality is scattered again by the liquid crystal molecules in the PDLC 509 and illuminates the liquid crystal display 510 in such state without the directionality.

Consequently the observer does not observe the left and right images in separated state but as a two-dimensional image.

Through the above-described process, the user can easily select the panoramic image pickup in addition to the stereoscopic image pickup.

At the recording of the panoramic image, a thumbnail image is prepared and recorded as in the case of stereoscopic image recording. Also the image playing operation utilizing the recorded thumbnail image is same as in the case of stereoscopic image.

Figure 19:
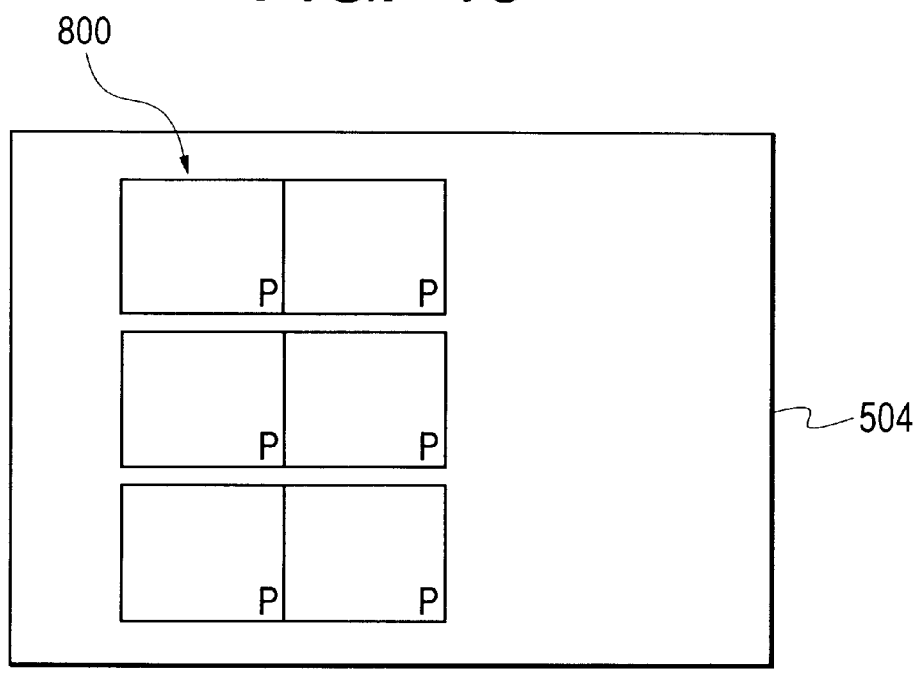
FIG. 19 is a view showing the display state of thumbnail images of panoramic images.

FIG. 19 shows the display state of the thumbnail images of the panoramic images, illustrating thumbnail images 800. The thumbnail image of the panoramic image is synthesized by calculating the overlapping area size for the thumbnail image, based on the overlapping area size of the main images.

In the foregoing fifth and sixth embodiments, it is assumed that the stereoscopic image pickup and the panoramic image pickup are executed separately, but the user may wish to record and reproduce the stereoscopic image and the panoramic image with a single recording medium.

Figure 20A:
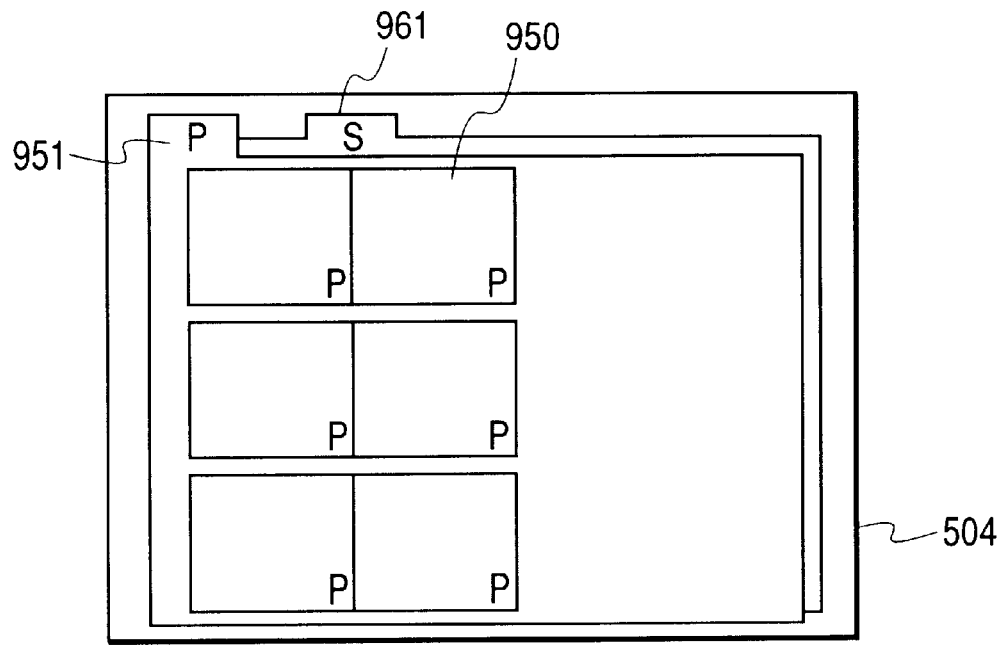
FIGS. 20A and 20B are views showing the display state of thumbnail images picked up in different modes on a liquid crystal display 504.
Figure 20B:
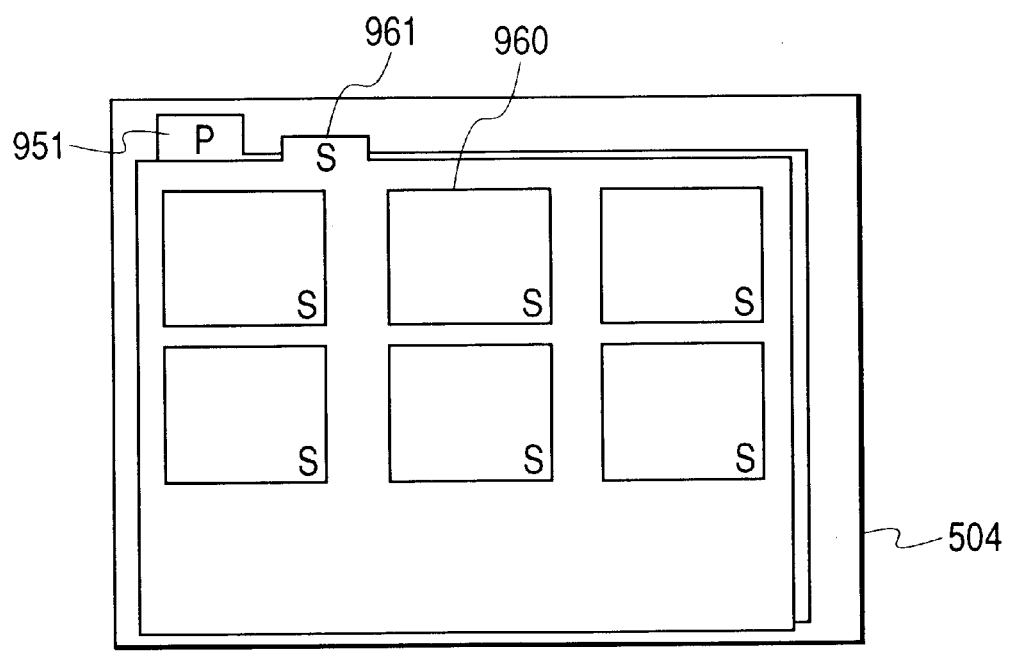
Figure 21A:
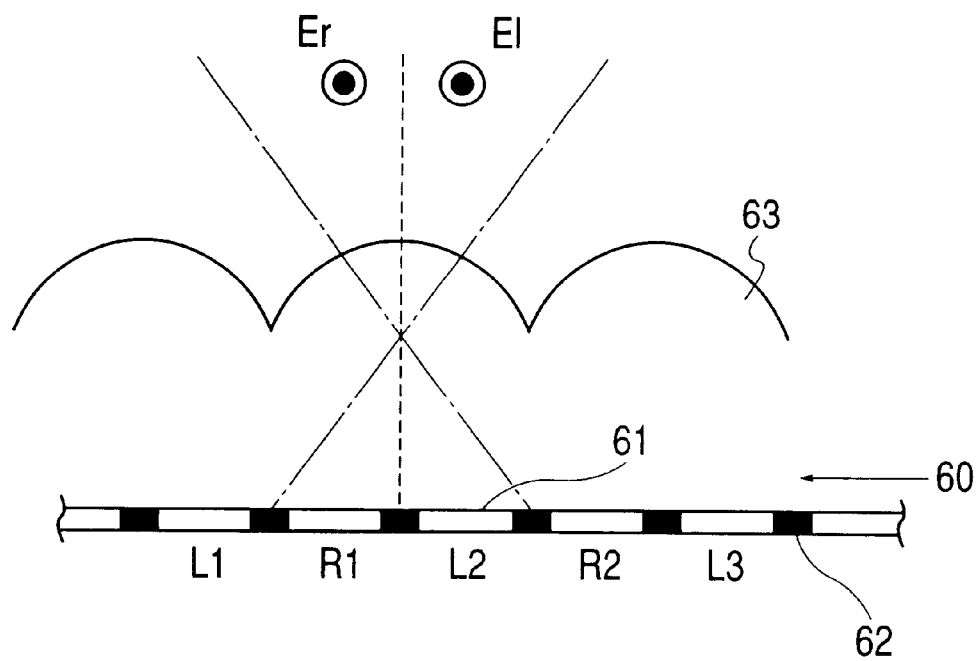
FIGS. 21A and 21B are views showing a conventional stereoscopic image display method employing a lenticular lens.
Figure 21B:
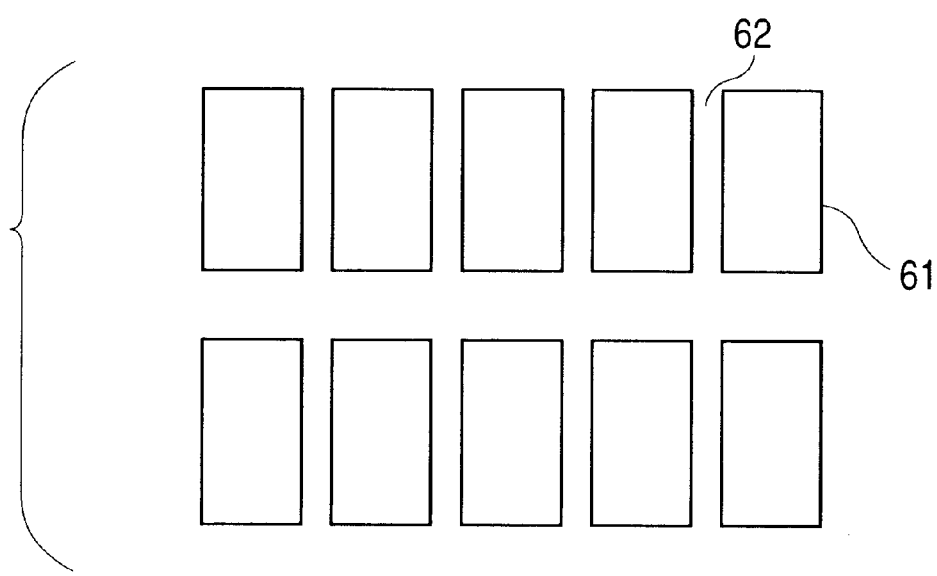
Figure 22A:
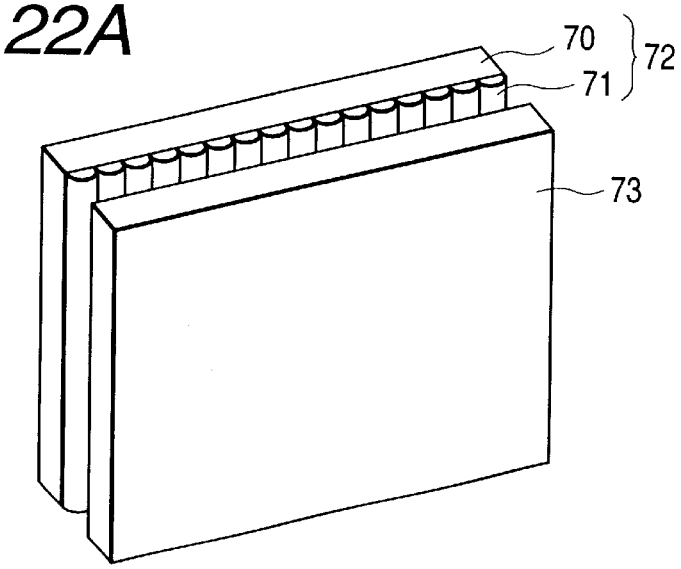
FIGS. 22A, 22B and 22C are views showing the configuration and the display method of a stereoscopic image display device disclosed in the Japanese Patent Laid-open Application No. 5-107663.
Figure 22B:
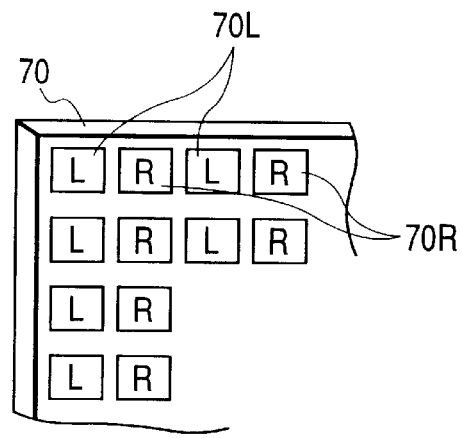
Figure 22C:
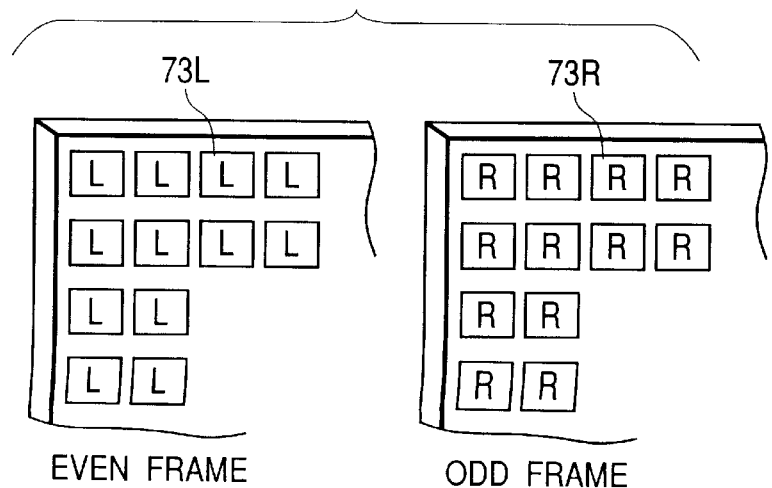

In the following there will be explained the display of thumbnail images picked up in the plural image pickup modes. FIGS. 20A and 20B illustrate the display state, on the liquid crystal display 504, of the thumbnail images picked up in the respective image pickup modes.

In FIGS. 20A and 20B, there are shown thumbnail images 950, 960; GUI's (graphic user interfaces) 951, 961 indicating the image pickup modes of the thumbnail images, respectively for the panoramic display and the stereoscopic display; a flag P indicating a panoramic image; and a flag S indicating a stereoscopic image.

The display function such as the GUI's 951, 961 allows the camera use to review the images in each image pickup mode. Each image pickup mode can be selected by the entry of a mode selection or an image to be used into the camera control unit 634, in a similar manner as in the fifth embodiment. Such selection of the image pickup modes may be achieved by any selection means of similar function.

The foregoing fifth, sixth and seventh embodiments respectively describe stereoscopic image pickup, panoramic image pickup and a mixed case of panoramic and stereoscopic image pickup. In the following there will be briefly explained a case of obtaining a single-eyed image utilizing only one of the compound eye image pickup systems. Also in case of picking up the single-eyed image, there is recorded a file of the main image and the thumbnail image, in a similar manner as in the case of panoramic image.

The file is recorded on the recording medium, and, at the playing operation, the thumbnail image is displayed on the liquid crystal display 504, as in the foregoing fifth, sixth and seventh embodiments.

The displayed thumbnail image is accompanied by a flag, for example T, indicating a single-eyed image. In this manner the user can distinguish the image by the accompanying flag, which is S for stereoscopic, P for panoramic or T for single-eyed. The thumbnail image accompanied by the flag T is not illustrated. In case these modes are mixedly present, the displayed images are accompanied by these flags.

Thus, in response to the selection of a desired thumbnail image by the user, the selected main image is read from the recording medium and is displayed as a single-eyed image.

As explained in the foregoing, in storing the plural images respectively picked up with the plural image pickup system in the image memory means after synthesis and displaying thus stored image on the image display means, the embodiments of the present invention allows the observation of the panoramic image at a rate same as the image pickup rate, by causing the horizontal compression means to compress the picked-up plural images in the horizontal direction, also causing the selection means to select the input of the plural image signals and to output the selected image signal to the image display means thereby compressing the plural images in the vertical direction, and causing the image memory means to store the plural images compressed by the memory control means in such a manner that the plural images compressed in the horizontal and vertical directions are displayed in arranged manner. Also in displaying the paired images picked up with the multi-lens image pickup apparatus simultaneously on an image display unit, a moving image can be displayed with a display rate same as the image pickup rate.

Also in synthesizing plural images picked up respectively with the plural image pickup systems into an image and displaying such synthesized image on the image display means, a stereoscopic image can be observed with a rate same as the image pickup rate by causing the selection means to select the input of plural image signal for each line, and sending the image signal, selected for each line, to the image display means thereby synthesizing the plural image signal into stripes.

Also in synthesizing plural images picked up respectively with the plural image pickup systems into an image and displaying such synthesized image on the image display means, a stereoscopic or panoramic image can be observed with a rate same as the image pickup rate by causing the selection means to select the input of plural image signal for each pixel and for each line, and sending the image signal, selected for each pixel and for each line, to the image display means thereby compressing the plural images in the horizontal and vertical directions and synthesizing such plural image signal into stripes.

It is also possible to output the image even after the image is processed in another means, by providing unit image memory means for time-sequentially storing the plural images, picked up by the plural image pickup systems, in the unit of each image, and storing the plural images in the unit image memory means and simultaneously reading the already plural images stored therein by the selection means.

Also even the image picked up utilizing an odd number of mirrors can be observed in correct manner by correcting the mirror-inverted image with the image correction means.

Also in synthesizing plural images picked up respectively with the plural image pickup systems into an image and displaying the stereoscopic image on the image display means, a thumbnail image corresponding to the stereoscopic image is displayed on the image display means by the display control means, whereby it is rendered possible, in picking up the stereoscopic image, to observe the stereoscopic image on the image display means (stereoscopic display) while confirming the stereoscopic effect, and, after the image pickup operation, to display the thumbnail images on the stereoscopic display thereby reviewing the recorded images. Consequently, in the playing operation of the picked-up image, the display of the thumbnail image on the image display unit allows to improve the resolving power of the stereoscopic image without increasing the frame rate required therefor.

It is thus rendered possible to provide a stereoscopic image system allowing to constantly observe the stereoscopic image during the image pickup operation, to adjust the stereoscopic effect in the course of the image pickup operation, to easily review the recorded stereoscopic images by thumbnail images in the playing operation after the recording operation, and, in the playing operation of a desired image, to select a thumbnail image and then to display the main image selected from such thumbnail image. Besides such system is capable of effecting the recording and playing in other modes such as the panoramic mode, in addition to the stereoscopic mode.

Furthermore, in synthesizing plural images picked up respectively with the plural image pickup systems into an image and displaying the panoramic image (or stereoscopic image) on the image display means, the display control means displays, on the image display means, a thumbnail image corresponding to the panoramic (or stereoscopic) image, thereby allowing to review the images.

Furthermore, in displaying the plural images picked up respectively with the plural image pickup systems, the plural image pickup systems are used to pick up the images of plural modes and the display control means displays, on the image display means, thumbnail images corresponding to the images of the different modes, whereby it is rendered possible to pick up a stereoscopic image and to observe a stereoscopic image on an ordinary stereoscopic display or a stereoscopic display enabling stereoscopic observation without the spectacles, and also to review the picked-up images by displaying the thumbnail images of the recorded images of the plural modes on the stereoscopic display.

Furthermore, as the thumbnail images displayed on the image display means are selected by the thumbnail image selection means and the original image of the selected thumbnail image is displayed on the image display means according to the mode, it is rendered possible to pick up the images of plural modes with the plural image pickup means, to display the thumbnail image of the image of the pickup mode on an ordinary stereoscopic display or a stereoscopic display enabling stereoscopic observation without the spectacles, and also to display the main image of respective mode by selecting the displayed thumbnail images.

Furthermore, the image display means, being a display device allowing observation with both eyes without the spectacles, allows to observe the stereoscopic image without spectacles and to confirm the stereoscopic effect in the course of the image pickup operation.

Also there can be provided a multi-lens image pickup apparatus in which the two-dimensional image and the stereoscopic image are compatible, as the images of the aforementioned plural modes are a single-eyed image, a panoramic image and a stereoscopic image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus adapted to synthesize plural images respectively picked up by image pickup means into a synthesized image, to store the synthesized image in image memory means, and to display the synthesized image stored in the image memory means on image display means, said apparatus comprising:

compression means for electronically compressing, in the horizontal direction, plural images picked-up by the image pickup means;

switching means for electronically compressing, in the vertical direction, the plural images horizontally compressed by said compression means, by switching over input among plural image signals corresponding to the plural images horizontally compressed by said compression means; and memory control means for controlling storage of compressed plural images in said image memory means in such a manner that plural images compressed in the horizontal and vertical directions and stored in said image memory means are displayed in a prearranged manner on the display means.

2. An apparatus according to claim 1, further comprising:

unit image memory means for time-sequentially storing the plural images respectfully picked up by the image pickup means, in a unit for each image;

wherein, simultaneously with the storage of the plural images in said unit image memory means, the stored plural images are read from said unit image memory means by said switching means.

3. An apparatus according to claim 1, wherein the image pickup means includes a mirror, and is adapted for a camera comprising image correction means for correcting an image picked up in an inverted state by said mirror.

4. An image pickup apparatus adapted to synthesize plural images respectively picked up by image pickup means into a synthesized image, and to display the synthesized image on image display means, said apparatus comprising:

means for compressing plural images by switching over input among plural image signals corresponding to the plural images for each line so as to thin out the plural image signals and outputting a synthesized image signal, switched for each line, to the image display means; and memory means for storing image signals compressed by said compressing and switching means, wherein stored image signals are synthesized in stripe shapes.

5. An apparatus according to claim 4, further comprising:

unit image memory means for time-sequentially storing the plural images respectively picked up by the image pickup means, in a unit for each image;

wherein, simultaneously with the storage of the plural images in said unit image memory means, the stored plural images are read from said unit image memory means by said compressing and switching means.

6. An apparatus according to claim 4, wherein the image pickup means includes a mirror, and is adapted for a camera comprising image correction means for correcting an image picked up in an inverted state by said mirror.

7. An image pickup apparatus adapted to synthesize plural images respectively picked up by image pickup means into a synthesized image, and to display the synthesized image on image display means, said apparatus comprising:

switching means for compressing the plural images by switching over input among plural image signals corresponding to the plural images for each pixel and for each line so as to thin out the plural images, and outputting a synthesized image signal, switched for each pixel and for each line, to the image display means, thereby compressing the plural images in the horizontal and vertical directions; and memory means for storing image signals compressed by said switching means, wherein stored image signals are synthesized in stripe shapes.

8. An apparatus according to claim 7, further comprising:

unit image memory means for time-sequentially storing the plural images respectively picked up by the image pickup means, in a unit for each image;

wherein, simultaneously with the storage of the plural images in said unit image memory means, the stored plural images are read from said unit image memory means by said switching means.

9. An apparatus according to claim 7, wherein the image pickup means includes a mirror, and is adapted for a camera comprising image correction means for correcting an image picked up in an inverted state by said mirror.

10. An image pickup apparatus adapted to synthesize plural images respectively picked up by image pickup means into a first synthesized image, and to display the first synthesized image on image display means capable of displaying a stereoscopic image, said apparatus comprising:

display control means for displaying, on the image display means the first synthesized image and a thumbnail image of the first synthesized image, synthesized separately therefrom.

11. An apparatus according to claim 10, wherein the image display means is a display device enabling observation with both eyes without spectacles.

12. An image pickup apparatus adapted to synthesize plural images respectively picked up by image pickup means into a first synthesized image, and to display the first synthesized images a panoramic image on image display means, said apparatus comprising:

display control means for displaying, on the image display means, the first synthesized image and a thumbnail image of the first synthesized panoramic image, synthesized separately therefrom.

13. An image pickup apparatus adapted to display plural images respectively picked up by image pickup means on image display means capable of displaying a stereoscopic image, said apparatus comprising:

image pickup means for picking up images of plural modes with the image pickup means; and display control means for displaying, on the image display means, a first synthesized image and a thumbnail image produced by processing a stereoscopic image, synthesized separately therefrom.

14. An apparatus according to claim 13, wherein the image display means is a display device enabling observation with both eyes without spectacles.

15. An apparatus according to claim 13, wherein the images of plural modes are a single-eyed image, a panoramic image and a stereoscopic image.

16. An apparatus according to claim 13, further comprising;

thumbnail image selection means for selecting one of plural thumbnail images displayed on the image display means; and main image display means for displaying a main image of a selected thumbnail image according to the mode of the main image.

17. An apparatus according to claim 16, wherein the image display means is a display device enabling observation with both eyes without spectacles.

18. An apparatus according to claim 16, wherein the images of plural modes are a single-eyed image, a panoramic image and a stereoscopic image.

* * * * *

UNITED STATES PATENT AND TRADEMARK OFFICE
CERTIFICATE OF CORRECTION

PATENT NO.    : 6,507,358 B1
DATED         : January 14, 2003
INVENTOR(S)   : Katsuhiko Mori et al.

It is certified that error appears in the above-identified patent and that said Letters Patent is hereby corrected as shown below:

Title page,
Item [57], ABSTRACT,
Line 8, "comprising" should read -- compressing -- and "picked-up" should read -- picked up --.

Column 1,
Line 16, "display" should read -- displays --; and
Line 51, "basis," should read -- basis, whereby --.

Column 7,
Lines 62, 63 and 67, "same" should read -- the same --.

Column 8,
Line 12, "pixel," should read -- pixels, --.

Column 9,
Lines 16, 21 and 47, "same" should read -- the same --.

Column 10,
Lines 2 and 5, "same" should read -- the same --.

Column 11,
Line 42, "electrodes" should read -- electrodes, --; and
Line 49, "m ode," should read -- mode, --.

Column 12,
Lines 40 and 63, "CCD's" should read -- CCDs --; and
Line 59, "is" should read -- in --.

Column 15,
Line 24, "stereo scopic" should read -- stereoscopic --; and
Line 61, "same" should read -- the same --.

Column 16,
Line 12, "CCD's" should read -- CCDs --;
Line 34, "same" should read -- the same --;
Lines 54 and 59, "GUI's" should read -- GUIs --; and
Line 60, "use" should read -- user --.

UNITED STATES PATENT AND TRADEMARK OFFICE
CERTIFICATE OF CORRECTION

PATENT NO.   : 6,507,358 B1
DATED        : January 14, 2003
INVENTOR(S)  : Katsuhiko Mori et al.

It is certified that error appears in the above-identified patent and that said Letters Patent is hereby corrected as shown below:

<u>Column 17,</u>
Line 27, "allows" should read -- allow --; and
Lines 28, 41, 47 and 57, "same" should read -- the same --.

<u>Column 19,</u>
Line 23, "picked-up" should read -- picked up --.

<u>Column 20,</u>
Line 51, "images a panoramic" should read -- images as a panoramic --.

Signed and Sealed this

Twenty-second Day of July, 2003

JAMES E. ROGAN
*Director of the United States Patent and Trademark Office*